(12) United States Patent
Scott

(10) Patent No.: US 8,550,486 B2
(45) Date of Patent: Oct. 8, 2013

(54) APPARATUS FOR LEVELING A TRAILER AND DAMPENING SWAY

(75) Inventor: Gary Scott, Milwaukie, OR (US)

(73) Assignee: Progress Mfg. Inc., Provo, UT (US)

( * ) Notice: Subject to any disclaimer, the term of this patent is extended or adjusted under 35 U.S.C. 154(b) by 0 days.

(21) Appl. No.: 12/211,053

(22) Filed: Sep. 15, 2008

(65) Prior Publication Data

US 2009/0008904 A1 Jan. 8, 2009

Related U.S. Application Data

(63) Continuation of application No. 12/165,488, filed on Jun. 30, 2008, now abandoned.

(60) Provisional application No. 60/937,652, filed on Jun. 29, 2007.

(51) Int. Cl.
*B60D 1/32* (2006.01)

(52) U.S. Cl.
USPC ............................................ 280/455.1

(58) Field of Classification Search
USPC .................................. 280/455.1, 432, 474
See application file for complete search history.

(56) References Cited

U.S. PATENT DOCUMENTS

| | | | |
|---|---|---|---|
| 3,021,154 A | 2/1962 | Hedgepeth | |
| 3,347,561 A | 10/1967 | Hedgepeth | |
| 3,434,735 A * | 3/1969 | Bernard | 280/406.2 |
| 3,445,125 A | 5/1969 | Stewart | |
| 3,490,789 A | 1/1970 | Stewart | |
| 3,600,004 A | 8/1971 | Newkirk | |
| 3,602,529 A | 8/1971 | Derr, Jr. | |
| 3,633,939 A | 1/1972 | Evernham | |
| 3,647,029 A | 3/1972 | Hanley | |
| 3,778,088 A | 12/1973 | Alexander | |
| 3,845,845 A | 11/1974 | Geisthoff | |
| 4,140,206 A | 2/1979 | Yamazaki et al. | |
| 4,230,333 A | 10/1980 | Persyn | |
| 4,614,353 A | 9/1986 | Mayer | |
| 4,722,542 A * | 2/1988 | Hensley | 280/447 |
| 4,792,151 A | 12/1988 | Feld | |
| 4,815,752 A | 3/1989 | Young et al. | |
| 5,375,867 A | 12/1994 | Kass et al. | |
| 5,465,991 A | 11/1995 | Kass et al. | |
| 5,580,076 A | 12/1996 | DeRoule et al. | |
| 5,628,525 A | 5/1997 | Kass et al. | |
| 5,890,726 A | 4/1999 | McCoy et al. | |
| 5,934,698 A | 8/1999 | Despain | |
| 5,984,341 A | 11/1999 | Kass et al. | |
| 6,142,500 A | 11/2000 | Sargent | |
| 6,419,257 B1 | 7/2002 | McCoy et al. | |
| 6,629,701 B1 | 10/2003 | Colibert | |
| 6,722,682 B2 | 4/2004 | Valliere et al. | |
| 6,860,501 B2 | 3/2005 | Schmidt et al. | |
| 6,923,452 B1 | 8/2005 | Zachmeier et al. | |

* cited by examiner

*Primary Examiner* — Tony Winner
(74) *Attorney, Agent, or Firm* — Clayton, Howarth & Cannon, P.C.

(57) ABSTRACT

An apparatus for tensioning spring arms used in conjunction with a weight distribution hitch. The apparatus may comprise a mechanical linkage that may be operable to multiply an input force provided by a jack to an output force of sufficient magnitude to tension the spring arms. The mechanical linkage may comprise a pair of rigid arms that are linked to a support post of a trailer jack. The pair of rigid arms may automatically be raised in conjunction with the support post being operated from a lowered position to a raised position. The rigid arms may exert a force on a cross-piece member extending between the spring arms. Alternatively, the mechanical linkage may comprise a flexible member for placing the spring arms under tension.

58 Claims, 17 Drawing Sheets

APPARATUS FOR LEVELING A TRAILER AND DAMPENING SWAY

CROSS-REFERENCE TO RELATED APPLICATIONS

This application claims the benefit of all of the following: U.S. patent application Ser. No. 12/165,488, filed Jun. 30, 2008, which claims priority to U.S. Provisional Application No. 60/937,652, filed Jun. 29, 2007, both of which are hereby incorporated by reference herein in their entireties, including but not limited to those portions that specifically appear hereinafter, the incorporation by reference being made with the following exception: In the event that any portion of the above-referenced applications are inconsistent with this application, this application supercedes said above-referenced applications.

STATEMENT REGARDING FEDERALLY SPONSORED RESEARCH OR DEVELOPMENT

Not Applicable.

BACKGROUND

1. The Field of the Invention

The present disclosure relates generally to trailer hitch devices and accessories, and more particularly, but not necessarily entirely, to a device for stabilizing a trailer hitch by leveling the trailer with respect to the tow vehicle and by dampening sway.

2. Description of Related Art

Various different types of trailer hitches are known in the art for attaching trailers to towing vehicles. One of the most common types of towing systems utilizes a ball hitch. Typical ball hitches have a generally spherical shaped ball with a stem or threaded rod extending from a base of the ball. The threaded rod may be configured to engage a hitch head mounted on the towing vehicle using a threaded receiver or ball hitch fitting. A trailer coupling member, positioned on a front of the trailer tongue, may engage the ball hitch in a loose friction fit, and may be secured to the ball in preparation for towing.

One of the biggest safety concerns with towing trailers is that the trailers may sway, leading to loss of control of the towing vehicle. A number of factors may contribute to sway, including: side winds, passing vehicles, quick lane changes, uneven roads and sudden stops. Some trailer hitches may not handle these situations well and may often enhance the sway problem making driving even more stressful and difficult.

Another common problem encountered when towing a trailer is "highway hop," or the bouncing that often happens to trailers on uneven roadways. This problem may be caused by uneven weight distribution. With ordinary ball-type hitches, most of the trailer tongue-weight may be carried on the back axle of the tow vehicle. This may raise the front end of the tow vehicle. The uneven distribution of weight may make steering control more difficult, especially during emergency situations. Weight distribution allows a trailer and tow vehicle to be level. Risks associated with driving a trailer without a weight distribution hitch may include loss of steering control, braking difficulties, and hitch dragging.

Some hitches include load equalizing systems utilizing spring arms or bars, sometimes also referred to as load distribution arms, to distribute loads and allow the towing vehicle and trailer to remain level. One end of the spring arms may be attached under the ball hitch and hitch head. The spring arms may extend from the hitch head towards the trailer. The end of the spring arms opposite the hitch head may be lifted or loaded to place an upward force on the hitch head to thereby equalize the load exerted on the trailer hitch. Other mechanisms may also be used in association with a trailer hitch to reduce side sway of the trailer. U.S. Pat. No. 3,600,004 (granted Aug. 17, 1971 to Newkirk) and U.S. Pat. No. 6,419,257 (granted Jul. 16, 2002 to McCoy et. al.) disclose exemplary trailer hitch mechanisms known in the art for equalizing loads and reducing sway.

Despite the advantages of the known trailer hitches, improvements are still being sought. For example, devices are known in the art to facilitate lifting the spring arms to equalize loads exerted by trailer hitches. U.S. Pat. No. 4,213,627 (granted Jul. 22, 1980 to Thompson) discloses an anti-sway type trailer hitch having spring arms or load-leveling bars. The spring arms are loaded to transfer the trailer's weight away from the hitch through a pair of brackets that are adjustably mounted on the trailer tongue. The brackets have eyes at the lower ends for receiving the spring arms therethrough. A small, portable hydraulic jack is used to jack the brackets upwardly to thereby load the spring arms. A drawback with the apparatus disclosed in U.S. Pat. No. 4,213,627 is that installation of the spring arms through the eyes in the brackets may be difficult to accomplish. Moreover, the brackets may not be effective in reducing sway. Also, the spring arms may be required to be moved a considerable distance to be properly loaded. Thus, the configuration of the device disclosed in U.S. Pat. No. 4,213,627 may make jacking of the spring arms into position a time consuming and burdensome task.

Similarly, U.S. Pat. No. 4,230,333 (granted Oct. 28, 1980 to Persyn) discloses trailer hitch having a spring arm that is loaded using a screw jack. The configuration of the device disclosed in U.S. Pat. No. 4,230,333 may make jacking of the spring arms into position a difficult task to accomplish.

Another device for loading the spring arms is disclosed in U.S. Pat. No. 4,253,680 (granted Mar. 3, 1981 to Albright et al.), which discloses a trailer hitch having spring arms that are loaded using an electrically controlled winch. A drawback of this device is that the electrically controlled winch may be costly to manufacture and maintain. Moreover, failures in the electrical system may result in increased difficulty in operating and loading the spring bars.

The prior art is thus characterized by several disadvantages that are addressed by the present disclosure. The present disclosure minimizes, and in some aspects eliminates, the above-mentioned failures, and other problems, by utilizing the methods and structural features described herein.

The features and advantages of the disclosure will be set forth in the description which follows, and in part will be apparent from the description, or may be learned by the practice of the disclosure without undue experimentation. The features and advantages of the disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
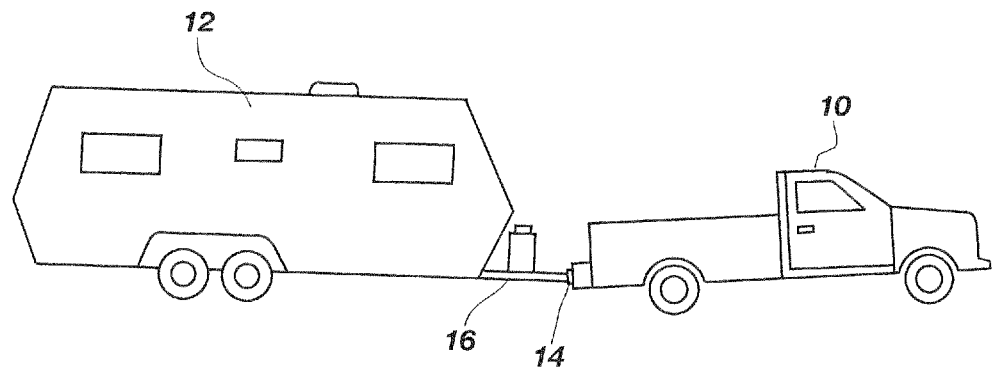
FIG. 1 is a side view of a towing vehicle towing a trailer using a trailer hitch without an equalized load.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

The publications and other reference materials referred to herein to describe the background of the disclosure, and to provide additional detail regarding its practice, are hereby incorporated by reference herein in their entireties, with the following exception: In the event that any portion of said reference materials is inconsistent with this application, this application supercedes said reference materials. The reference materials discussed herein are provided solely for their disclosure prior to the filing date of the present application. Nothing herein is to be construed as a suggestion or admission that the inventors are not entitled to antedate such disclosure by virtue of prior disclosure, or to distinguish the present disclosure from the subject matter disclosed in the reference materials.

It must be noted that, as used in this specification and the appended claims, the singular forms "a," "an," and "the" include plural referents unless the context clearly dictates otherwise. Moreover, as used herein, the terms "comprising," "including," "containing," "characterized by," and grammatical equivalents thereof are inclusive or open-ended terms that do not exclude additional, unrecited elements or method steps.

Referring now to FIG. 1, a side view is shown of a tow vehicle 10 towing a trailer 12 with a trailer hitch 14. It will be understood that the towing vehicle 10 may be any variety of vehicle known in the art, such as a car or truck, or any other variety of on-road or off-road vehicle, for example. Likewise, the principles of the present disclosure may be utilized with any variety of trailer known in the art, such as camping trailers, boat trailers or cargo trailers, for example. The trailer 12 may include a tongue 16 extending from a forward end of the trailer 12. A coupler may be located on an end of the trailer tongue for receiving a ball of the hitch 14, in a manner known in the art.

Figure 2:
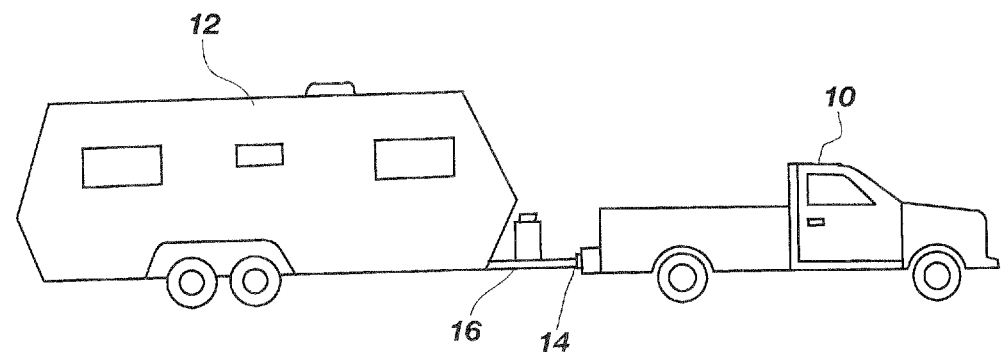
FIG. 2 is a side view of a towing vehicle towing a trailer using a trailer hitch and having an equalized load.

As shown in FIG. 1, the load from the trailer 12 may force the rear end of the tow vehicle 10 down and raise the front end of the tow vehicle 10 due to an uneven weight distribution. This uneven distribution of weight may cause steering of the towing vehicle 10 to become more difficult and may cause braking difficulties or the hitch 14 to even drag on the ground. Weight distribution systems, as discussed more fully below, may be utilized to more evenly distribute the load of the trailer 12 to the tow vehicle 10 to thereby make the trailer 12 and towing vehicle 10 more level, as shown in FIG. 2.

Figure 3:
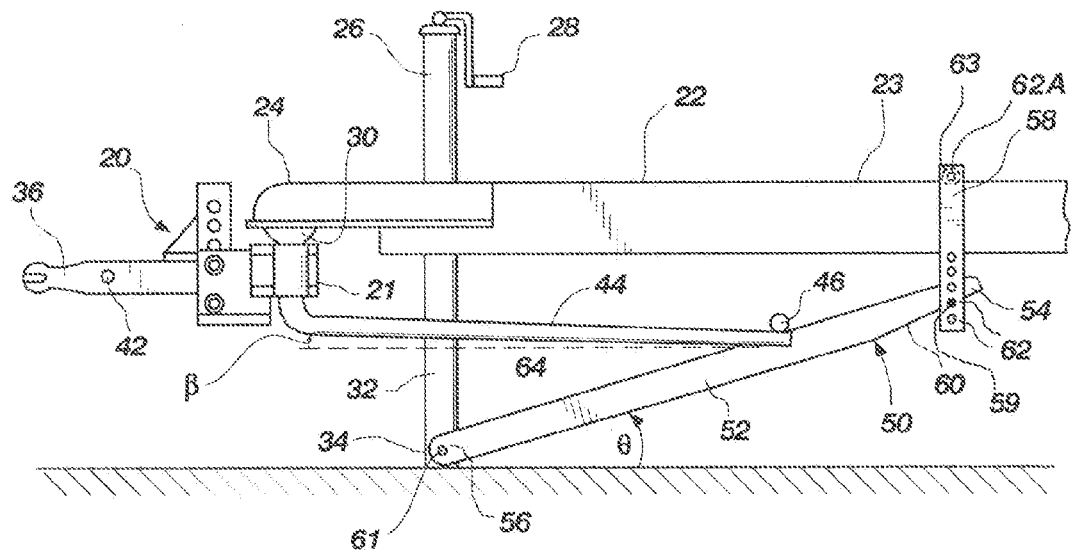
FIG. 3 is a side, breakaway view of a mechanical linkage for tensioning a pair of spring arms in a lowered, unloaded position.

Referring now to FIG. 3, an exemplary embodiment of a weight distribution hitch 20 pursuant to the present disclosure is shown attached to a tongue 22 of a trailer 23. The tongue 22 may be connected to a trailer body, not shown, and may include a coupler 24 and a trailer jack 26. The coupler 24 is operable to engage a ball 30 of the hitch 20 as is known to one having ordinary skill in the art. The hitch 20 has a head 21. The jack 26 may be operable to support the weight of the tongue 22 when the tongue 22 is not supported by a tow vehicle. In an embodiment of the present disclosure, the jack 26 may include a hand-operated crank 28 for allowing a user to raise and lower a support post 32 as is known to one having ordinary skill in the art. In another embodiment of the present disclosure, the jack 26 may be operated by an electric motor in lieu of the crank 28. A terminal end 34 of the support post 32 may be operable to engage a support surface, such as the ground or a block.

Figure 4:
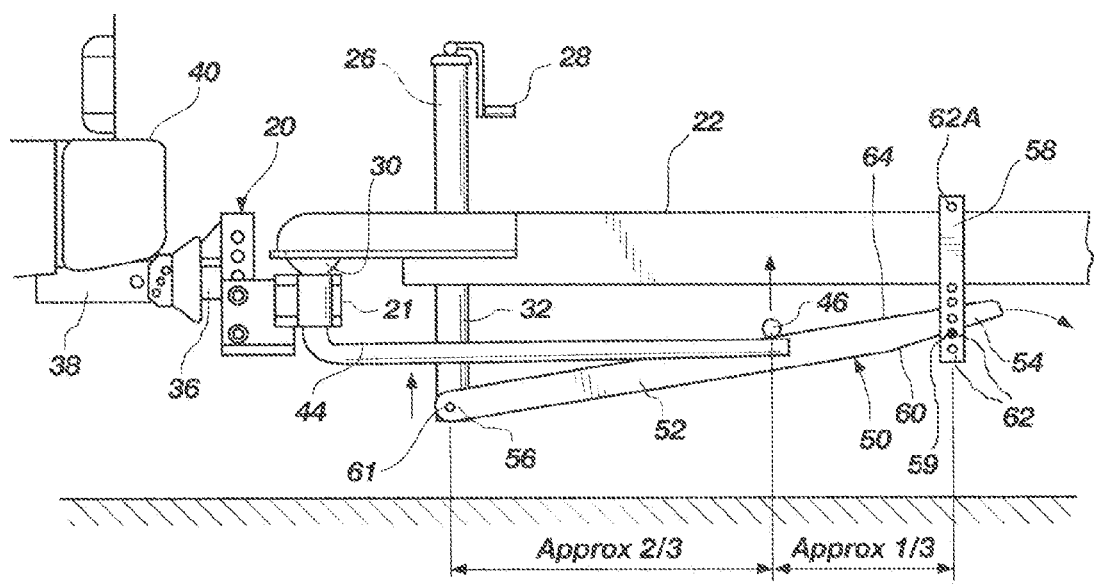
FIG. 4 is a side, breakaway view of the mechanical linkage shown in FIG. 3 in a partially raised position.
Figure 5:
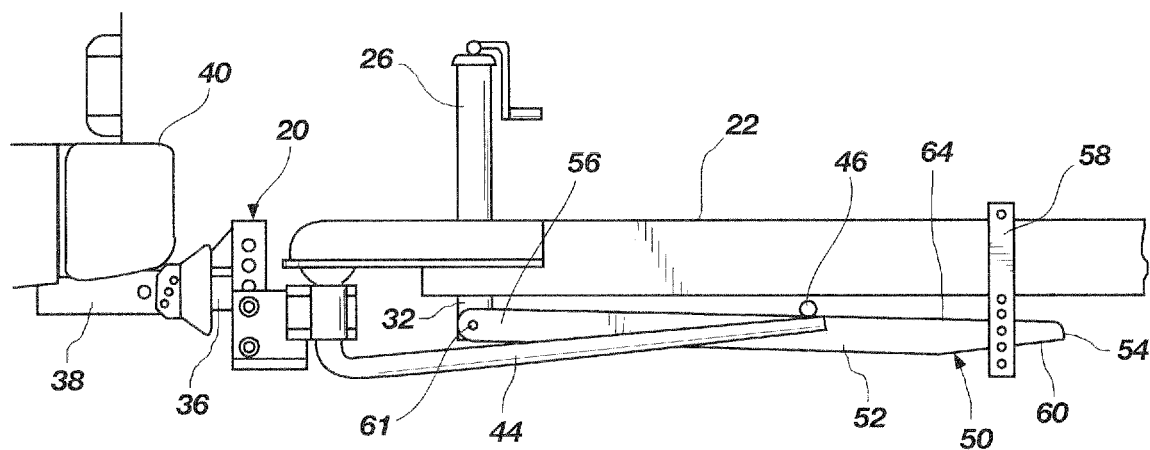
FIG. 5 is a side, breakaway view of the mechanical linkage shown in FIG. 3 in a fully raised position.

As shown in FIGS. 4 and 5, the hitch 20 may further comprise a shank 36 for engaging a receiver 38 of a tow vehicle 40 as is known to one having ordinary skill in the art.

Referring back to FIG. 3, the shank 36 may include a bore 42 for receiving a pin (not shown) to thereby secure the shank 36 to the receiver 38 of the tow vehicle 40. Extending rearwardly from the hitch 20 may be a pair of spring arms 44, and although only one spring arm 44 is visible in FIGS. 3-5, both spring arms 44 are visible in FIG. 6. The spring arms 44 may be operable to distribute the weight of the trailer tongue 22 more evenly to the tow vehicle 40. The spring arms 44 may also be operable to reduce sway between the tow vehicle 40 and the tongue 22. As is further shown in FIGS. 3-6, the spring arms 44 may be interconnected by a rigid cross-piece member 46.

As will now be explained in reference to FIGS. 3-6, a mechanical linkage 50 may be operable to generate an output force operable to place the spring arms 44 under tension in response to an input force. In an embodiment of the present disclosure, the mechanical linkage 50 may receive the necessary input force to place the spring arms 44 under tension from the trailer jack 26. In particular, as the support post 32 of the jack 26 is moved from a lowered position to a raised position, the mechanical linkage 50 may raise the spring arms 44 in a corresponding manner until the weight of the trailer tongue 22 is more evenly distributed through the hitch 20 to the tow vehicle 40.

Figure 6:
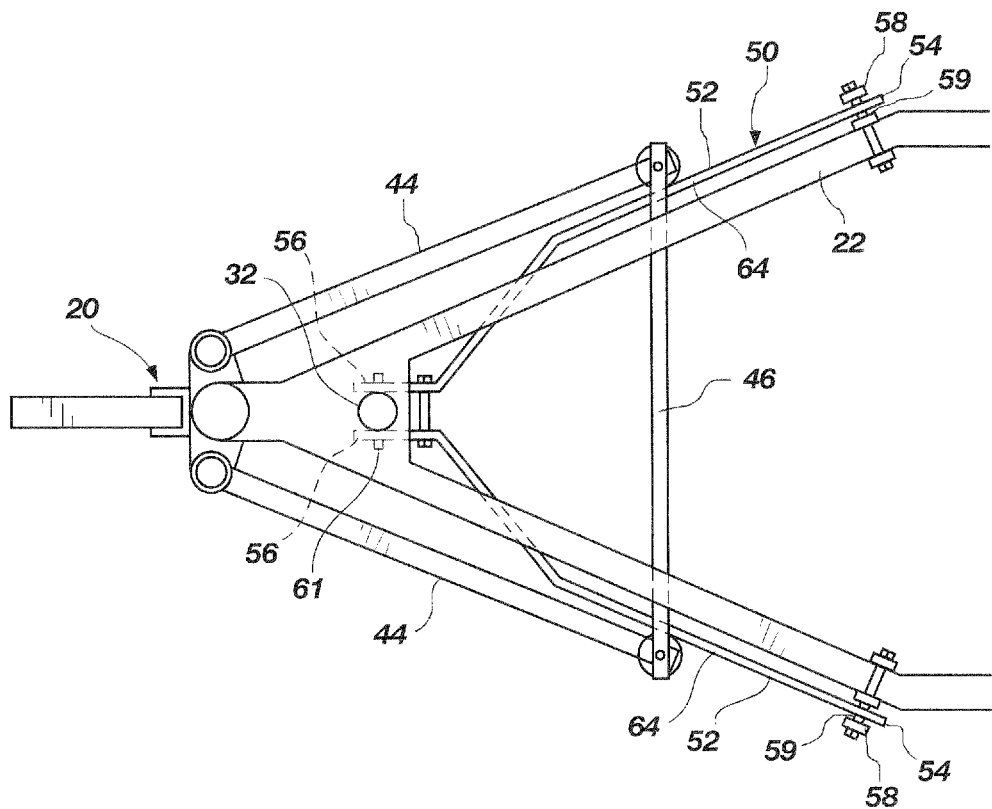
FIG. 6 is a top, breakaway view of the mechanical linkage shown in FIG. 3.

As best seen in FIG. 6, but visible in all of FIGS. 3-5, in an embodiment of the present disclosure, the mechanical linkage 50 may comprise a pair of rigid arms 52. Each of the rigid arms 52 may comprise a rear portion 54 and a forward portion 56. Each of the rear portions 54 of the rigid arms 52 may be supported by one of a pair of bracket assemblies 58 attached to the tongue 22 of the trailer 23. The bracket assemblies 58 may be removably installed onto the tongue 22 of the trailer 23 using fasteners, such as bolts or the like. It will be appreciated that the bracket assemblies 58 may be permanently attached to the tongue 22 or integrated into the tongue 22 of the trailer 23. The bracket assemblies 58 may each be configured and adapted to provide a horizontally disposed support member 59. The support members 59 may support the rear portions 54 of the rigid arms 52 in a substantially vertical direction.

It will be noted that the rear portions 54 of the rigid arms 52, as shown, rather that be fixedly secured to the support members 59 of the bracket assemblies 58, may be slidably engaged. More specifically tapered portions 60 of the rear portions 54 of the rigid arms 52 may slidably engage the support members 59 of the bracket assemblies 58 such that the rigid arms 52 may slide forward and rearward and pivot with respect to the bracket assemblies 58 and the tongue 22. Thus, the rear portions 54 of the rigid arms 52 have non-fixed pivot points. It will be appreciated that the term "forward" refers to the direction of the tow vehicle 40 and the term "rearward" refers to the direction towards the back of the trailer 23. However, and alternatively, it is to be understood that the rear portions 54 of the rigid arms 52 can, if desired, be fixedly secured to the support members 59 of the bracket assemblies 58.

As further seen in FIG. 3, each of the bracket assemblies 58 may include a plurality of upwardly-directed bores 62 for accommodating different sized trailer tongues. The bores 62 may, if desired, be vertically aligned. More specifically, a securing bolt 63 is placed in upper bore 62A to secure the tongue 62 thereby, and support member 59 is secured within one of the lower bores 62, and it is to be understood that upper bore 62A could instead constitute two or more bores. Accordingly, bracket assembly 58 can accommodate larger trailer tongues, either by placing the securing bolt 63 in a higher upper bore 62A (in cases in which upper bore 62A constitutes two or more bores), and/or the support member 59 could be secured within a lower selection among the lower bores 62, to ensure there is enough space between securing bolt 63 and support member 59 to accommodate a larger trailer tongue 22.

Accordingly, the rear portion 54 of the rigid arms 52 can be positioned higher or lower within the bores 62, as desired, depending on which bore 62 is pinned to have support member 59 secured therein or thereto. Further, it is to be understood that any mechanical means for selectively intercoupling or otherwise disposing the rear portion 54 of the rigid arms 52 into a positioned relationship with the bracket assembly 58, is within the scope of the invention and can be considered xxxx An additional function of the plurality of the bores 62, provides a height adjustment of the rear portion 54 of the rigid arms 52. For example, the higher the rear portion 54 is set by adjustment usage of the bores 62, the more upper lifting (and resulting increased tension) is achievable in the spring bars 44. One advantage of the foregoing, is that it allows the tension to be increased in the spring arms 44, without causing the jack 26 to be closer to the ground when towing, thereby increasing ground clearance during towing.

As also seen in FIGS. 3-6, the forward portions 56 of the rigid arms 52 may be fixedly secured proximate the terminal end 34 of the support post 32 of the trailer jack 26 by a fastener 61. It will be appreciated that the fastener 61 may serve as a support member for the rigid arms 52. The connection between the support post 32 and the rigid arms 52 may be a fixed pivot point such that the rigid arms 52 may pivot around the fastener 61, but not slide forward or rearward. As seen in FIGS. 3-6, the cross-piece member 46 extending between the spring arms 44 may engage upper surface 64 of the rigid arms 52.

The process by which the spring arms 44 are placed under tension by the mechanical linkage 50 will now be explained in more detail in relation to FIGS. 3-5. As shown in FIG. 3, the support post 32 of the trailer jack 26 is shown in a lowered position such that the support post 32 may support the weight of the tongue 22 when the tongue 22 is not attached to the tow vehicle 40. The spring arms 44 may not be under any tension when the support post 32 is in the lowered position.

As shown in FIG. 4, the shank 36 of the hitch 20 may be installed into the receiver 38 of the tow vehicle 40. With the hitch 20 connected to the tow vehicle 40, the support post 32 may be raised to thereby transfer the weight of the tongue 22 to the tow vehicle 40. As the support post 32 is operated to a raised position, the rigid arms 52 of the mechanical linkage 50 may also be raised in a corresponding manner since the forward portions 56 of the rigid arms 52 are connected to the support post 32 by the fastener 61. At the same time the front portions 56 of the rigid arms 52 are being raised in conjunction with the raising of the support post 32, the rear portions 54 of the rigid arms 52 may slide rearward with respect to the support members 59 of the bracket assemblies 58. It will be appreciated that the rigid arms 52 may pivot around their respective engagements with the support members 59 of the bracket assemblies 58.

As the rigid arms 52 are raised by the support post 32, the upper surfaces 64 of the rigid arms 52 may lift the cross-piece member 46 extending between the spring arms 44. The upward lifting of the cross-piece member 46 may in turn lift the spring arms 44 and cause the spring arms 44 to be placed under tension. It will be noted that the cross-piece member 46 may engage the upper surfaces 64 of the rigid arms 52 at approximately two-thirds of the lengths of the rigid arms 52 from the support post 32 as is shown in FIG. 4. It will be appreciated that this geometry may reduce the forces and stresses on the jack 26 by providing a leverage advantage ratio of approximately 2:1 of the rigid arms 52 against the cross-piece member 46. Stated another way, the mechanical linkage 50 multiplies the input force provided by the support post 32.

As shown in FIG. 5, when the support post 32 of the jack 26 has been operated to a raised position, the spring arms 44 may be placed under tension by the upward force exerted by the rigid arms 52 on the cross-piece member 46. In their tensed state, the spring arms 44 may be operable to distribute the weight of the tongue 22 to the tow vehicle 40. In this manner, the support post 32 may provide an input force to the mechanical linkage 50. In addition, it will be noted that a linear input from the support post 32 is transformed to a rotational output by the mechanical linkage 50.

In turn, the mechanical linkage 50 may provide an increased output force sufficient in magnitude to place the spring arms 44 under tension. It will be further noted that the tension in the spring arms 44 may be adjusted by slightly raising or lowering the position of the support post 32 of the jack 26. That is, it will be noted that as the support post 32 is operated to an intermediate position, i.e., a position between a fully-lowered position and a fully-raised position, the rigid arms 52 may be raised to a corresponding intermediate position. Thus, as the support post 32 of the jack 26 is raised, the spring arms 44 may be automatically placed under tension in an amount that varies as a function of the position of the support post 32. It will be noted that the tension in the spring arms 44 may be removed by reversing the above described procedure, i.e., by lowering the support post 32.

The lower grouping of bores 62 can operate such that the support members 59 can also be adjusted vertically to several possible positions within the lower grouping of bores 62. It is to be understood that one of the advantages of the function and ability to move the support members 59 up and down, is that a user can change how high the rigid arms 52 can raise the spring arms 44 once the trailer jack 26 has fully retracted. If the support members 59 are set lower, the spring arms 44 are not lifted or loaded up as high, even with the jack fully raised. But if the support members 59 are set higher and the jack is likewise fully raised, the spring arms 44 will be lifted or loaded even higher, allowing the hitch to transfer more weight, when more weight is present. Stated another way, the lower grouping of bores 62 at the bottom of the bracket assemblies 58 function by providing a plurality of vertically-adjustable positions for the support members 59, which in turn provides a plurality of vertically-adjustable positions for the rear portions 54 of the rigid arms 52.

Accordingly, the support post 32 of the trailer jack 26 can be lowered or extended in order to release some tension from the spring arms 44 when less weight distribution is desired, or the support members 59 may be lowered instead, to accomplish the same purpose. Trailer users often desire to have the support post 32 of the trailer jack 26 raised or lowered as far upwardly as possible to maximize ground clearance when towing. If a trailer user lowers the trailer jack in order to achiever less weight distribution, and thereby lowers the support post 32, this could compromise or reduce ground clearance by leaving the support post 32 closer to the ground when towing. But if the jack is fully raised or retracted in all cases by a user, while the support members 59 are adjusted up or down by utilizing the multiple lower bores 62, the load on the spring arms 42 can thereby be adjusted as desired without compromising the ground clearance of the lower end of the support post 32.

Figure 7:
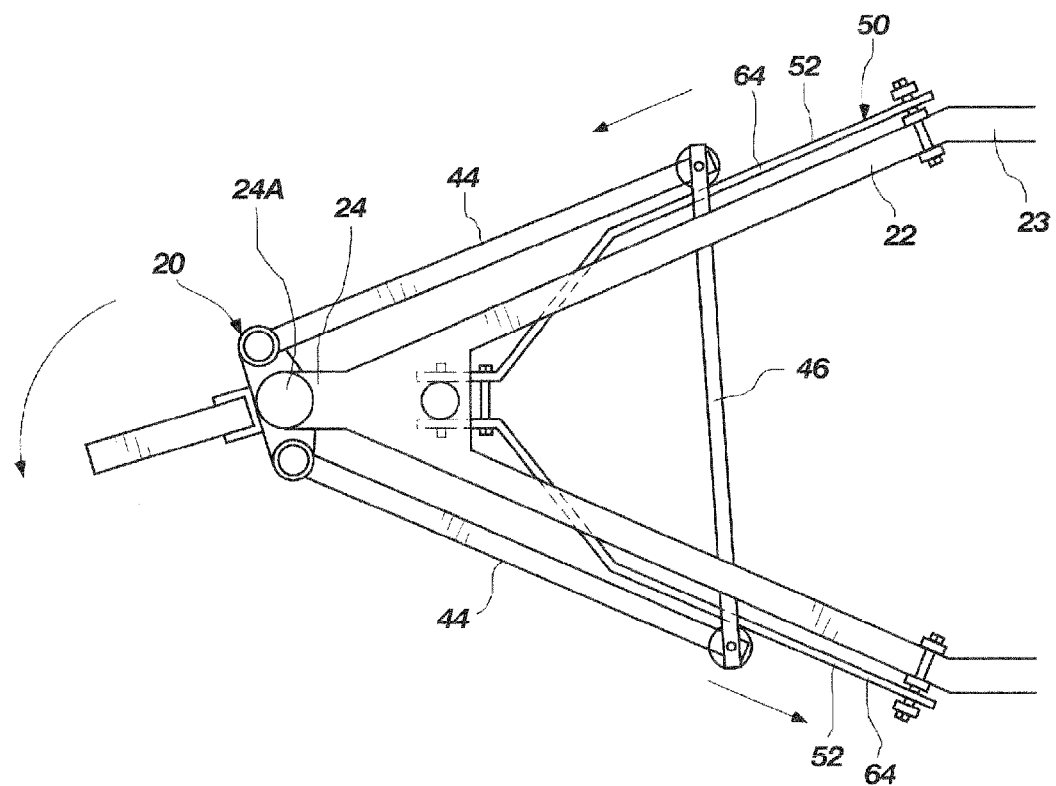
FIG. 7 is a top, breakaway view of the mechanical linkage shown in FIG. 3 undergoing a turn.
Figure 8:
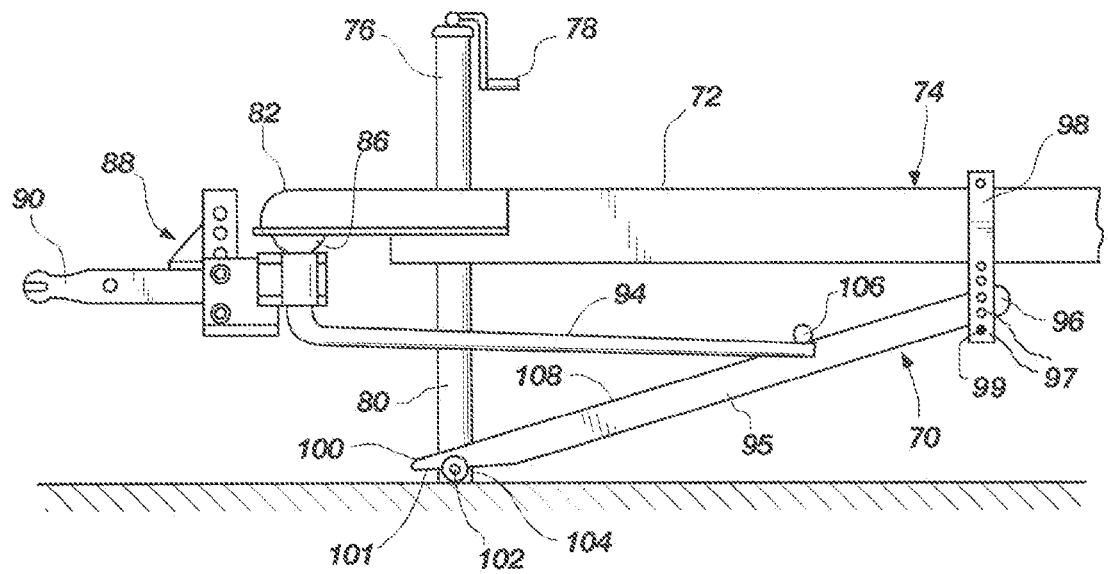
FIG. 8 is a side, breakaway view of a mechanical linkage for tensioning a pair of spring arms in a lowered, unloaded position.
Figure 9:
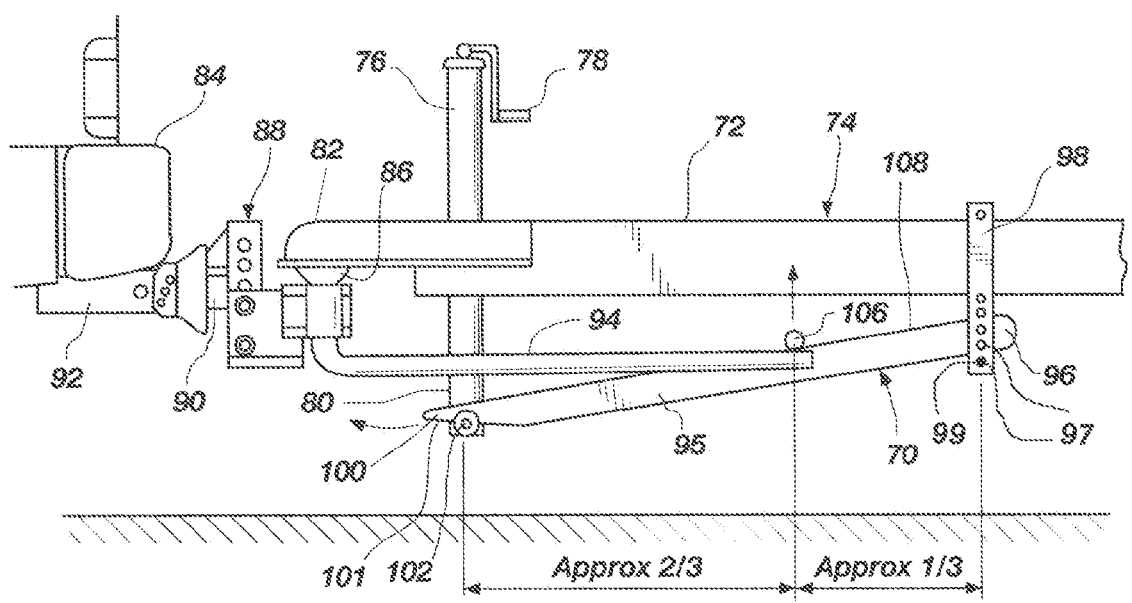
FIG. 9 is a side, breakaway view of the mechanical linkage shown in FIG. 8 in a partially raised position.
Figure 10:
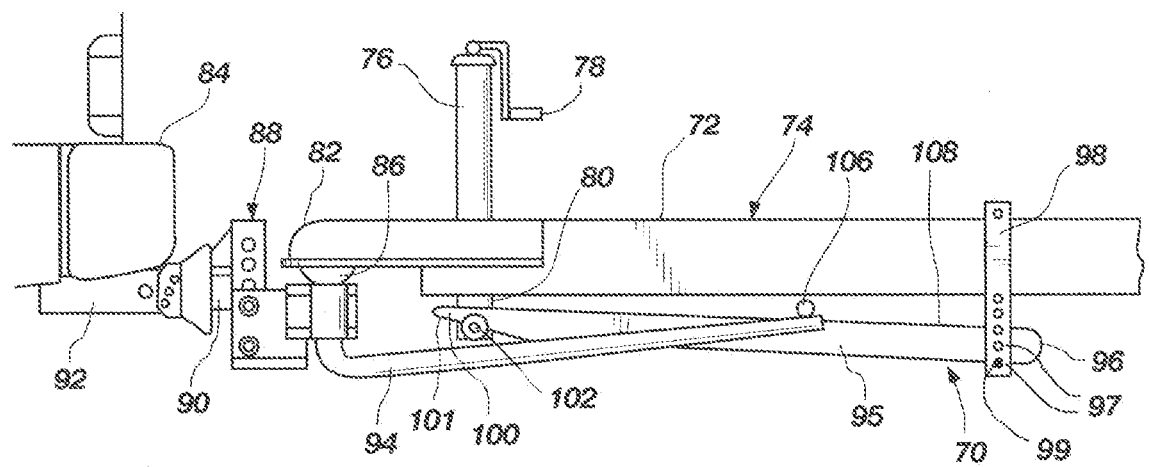
FIG. 10 is a side, breakaway view of the mechanical linkage shown in FIG. 8 in a fully raised position.

Similarly to the embodiment shown in FIGS. 3-7, the alternative version shown in FIGS. 8-10 also reveal the feature wherein the brackets 98 have a series of lower bores 97 that allow the pivot/connection point between support member 99 (which is identical to support member 59) and rear portions 96 of rigid arms be adjustable up or down. Even though this area is now "fixedly and pivotably connected", the height at which it is fixed and pivots is adjustable, and this allows for the spring arms 94 to be pulled up by greater or lesser amounts, while the support post 80 of the trailer jack 76 can be fully raised/retracted to maximize ground clearance for towing. In short, not all these bores 97 are just for the purpose of accommodating different frame heights, but can also accommodate the adjustable height of the main mechanical linkage.

Figure 24:
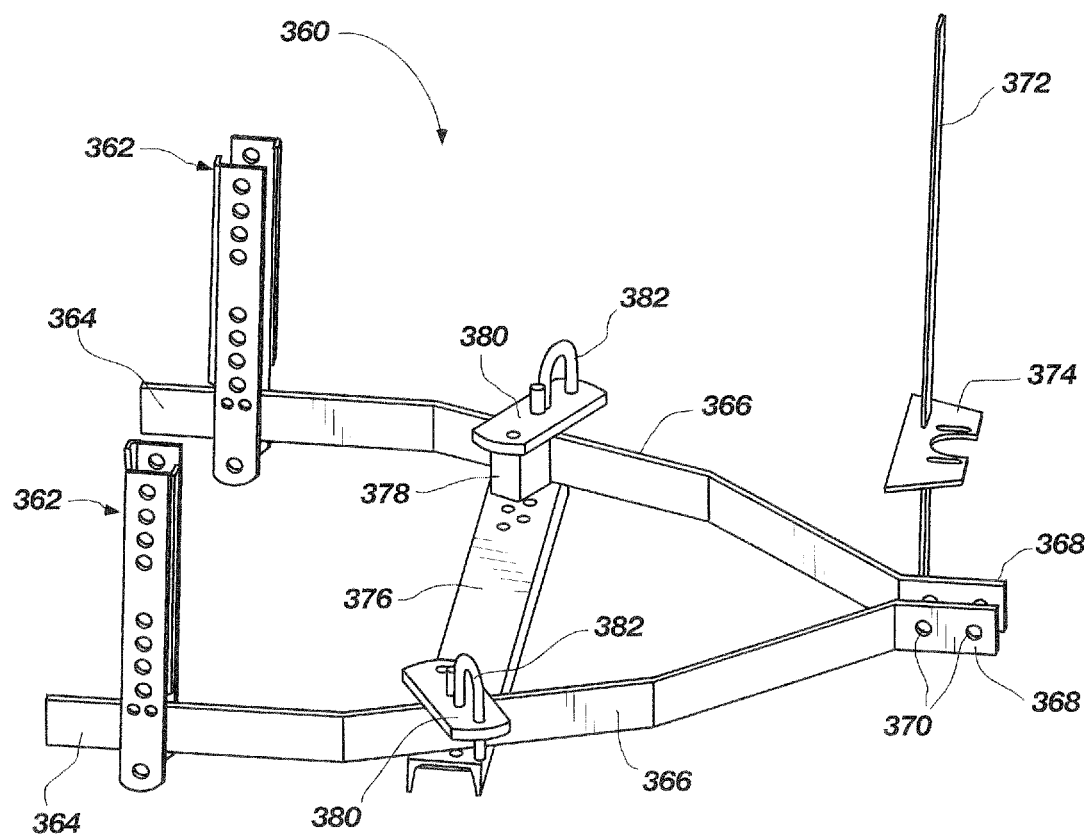
FIG. 24 is a perspective view of a mechanical linkage.

To see another better representation of what the dual purpose/dual groupings of bores in the brackets 58 or 98 look like, consider the same brackets in FIG. 24, bracket assemblies 362. In fact, the rear members 364 of the rigid arms 366 could always be set at the bottom of these bracket assemblies 362. However, the resulting height of this area depends on how high or low the bracket assemblies 362 are bolted onto a trailer frame. For example, the bracket assemblies 362 could be set with a bolt through the upper-most holes directly over the top of a trailer frame. As a result, the lower end of these brackets, and the rigid arms 366 that are engaging the supports will sit lower. In contrast, a trailer user could install these same bracket assemblies 362 as high as they possibly could go (the bolt for passing under the A-frame would be in the lowest possible set of bores shown). The upper ends of these bracket assemblies 362 may then protrude higher than the A-frame and be unused. As a result, the rigid arms 364 are set higher in relation to the trailer frame, which means that the spring arms can be pulled up higher when the jack is fully raised.

In continued reference to FIG. 24, the horizontal support member is always mounted in the same hole, located at the bottom end of the brackets. But to change the height of that support member in respect to the ground or with respect to the A-frame, the entire bracket assembly can be raise and lowered, as is allowed by the number of bores. In other, prior embodiments, it is possible that the support member itself could be adjusted to any number of available bores. In the latter case, the bracket assemblies themselves may not need to change height in respect to the trailer frame, because the support member simply moves up or down instead. Either way, the concepts of adjustability as put forth herein add another level of adjustability, in addition to altering the amount that the jack raises the support post. Maximum ground clearance can be maintained with a fully-raised jack, while changing the bracket heights can adjust the amount of weight distribution.

Figure 6A:
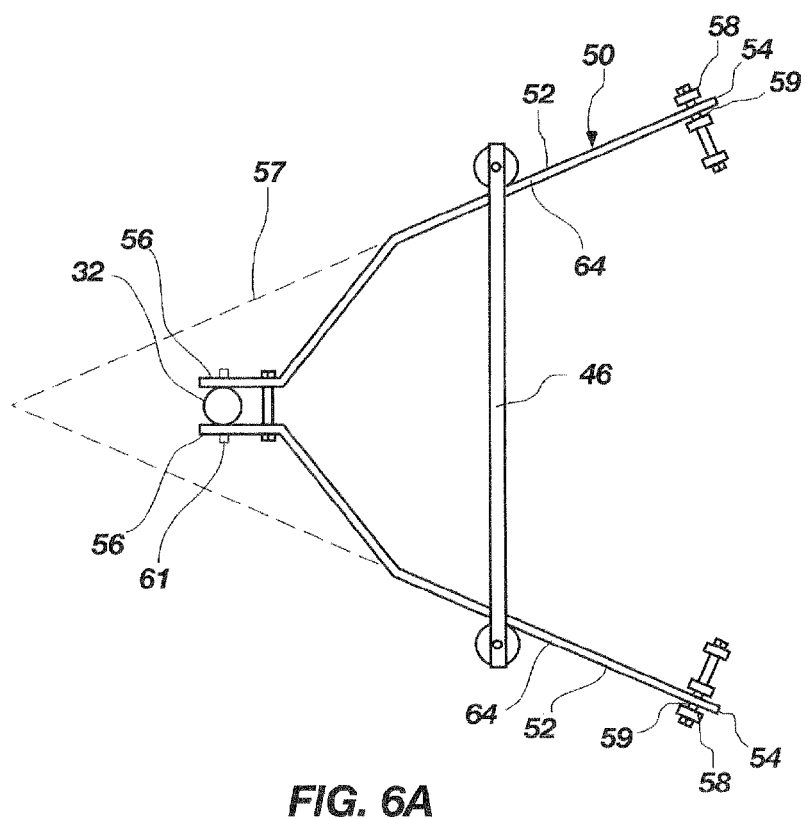
FIG. 6A is a top, breakaway view of a portion of the mechanical linkage shown in FIGS. 3 and 6.

Referring now to FIG. 6A, each rigid arm 52 may be linear, or substantially linear, in shape and orientation. Each rigid arm 52 may therefore include a substantially linear surface, and can be positioned as shown in FIG. 6A such that the substantially linear surfaces cooperatively form at least a portion of opposing sides of a triangle depicted at 57 in phantom line.

Referring now to FIG. 7, the manner in which the mechanical linkage 50 may reduce sway between the trailer 23 and the tow vehicle 40 (not explicitly shown) will now be explained. As the tow vehicle 40 starts a turn, the hitch 20 may begin a rotation that may pull one of the spring arms 44 forward and push the other spring arm 44 back as illustrated in FIG. 7. This movement of the spring arms 44 caused by the turn may cause the cross-piece member 46 extending between the spring arms 44 to rub or slide along the upper surfaces 64 of the rigid arms 52. Due to the considerable tension in the spring arms 44, there may exist a great deal of friction between the cross-piece member 46 and the upper surfaces 64 of the rigid arms 52. This frictional engagement may be operable to considerably dampen any sway between the trailer 23 and the tow vehicle 40. It will be further appreciated, that some adjustment in the amount of sway control may be accomplished by varying the tension in the spring arms 44 through adjustments in the vertical position of the support post 32.

Referring now to FIGS. 8-10, an exemplary embodiment of a mechanical linkage 70 pursuant to the present disclosure is shown. As before, the mechanical linkage 70 may be installed onto a tongue 72 of a trailer 74. The tongue 72 of the trailer 74 may include a trailer jack 76 having a support post 80 for supporting the weight of the tongue 72 when the trailer 74 is disconnected from a tow vehicle 84 as shown in FIGS. 9 and 10. The support post 80 may be operable between a lowered position as shown in FIG. 8 and a raised position as shown in FIG. 10. When in the lowered position as shown in FIG. 8, the support post 80 may engage the ground to thereby support the weight of the tongue 72 when the trailer 74 is not attached to the tow vehicle 84. The trailer jack 76 may include a hand-operated crank 78 for allowing a user to raise and lower the support post 80. In an embodiment of the present disclosure, the trailer jack 76 may be operated by an electric motor in lieu of the hand-operated crank 78.

The tongue 72 may further include a coupler 82 for connecting the trailer 74 to a ball 86 of a hitch 88. The hitch 88 may include a shank 90 for engaging a receiver 92 as shown in FIGS. 9 and 10 of the tow vehicle 84. Extending rearwardly from the hitch 88 may be a pair of spring arms 94, although only one is visible in FIGS. 8-10. As before, the purpose of the spring arms 94 is to more evenly distribute the weight of the tongue 72 of the trailer 74 to the tow vehicle 84.

The mechanical linkage 70 includes a pair of rigid arms 95, and although only one of the rigid arms 95 is shown in FIG. 8-10, the rigid arms 95 are configured in a similar manner to the rigid arms 52 as shown in FIGS. 3-6 with the following exception. Rear portions 96 of the rigid arms 95 may be fixedly and pivotally secured to brackets 98 while forward portions 100 of the rigid arms 95 may slidably and pivotally engage a support member 102 extending from a terminal end 104 of the support post 80. In particular, the support member 102 may extend laterally from the support post 80 to thereby vertically support tapered portions 101 of the forward portions 100 of the rigid arms 95 while still allowing the rigid arms 95 to slide forward and rearward and to pivot. Thus, it will be appreciated that the forward portions 100 of the rigid arms 95 have non-fixed pivot points.

As before, the mechanical linkage 70 may be operable to generate an output force operable to place the spring arms 94 under tension in response to an input force. In an embodiment of the present disclosure, the mechanical linkage 70 may receive the necessary input force to place the spring arms 94 under tension from the trailer jack 76. In particular, as the support post 80 of the trailer jack 76 is operated from a lowered position to a raised position, the mechanical linkage 70 may raise the spring arms 94 in a corresponding manner until the weight of the trailer tongue 72 is more evenly distributed through the hitch 88 to the tow vehicle 84. This process will be explained in more detail below.

As seen in FIG. 8, the hitch 88 is not connected to the tow vehicle 84 and the support post 80 of the jack 76 is in the lowered position. Thus, the support post 80 may be supporting the entire weight of the tongue 72 of the trailer 74. The spring arms 94 may not be under any significant amount of tension while the support post 80 is in the lowered position. Next, as shown in FIG. 9, the hitch 88 has been attached to a tow vehicle 84 by installing the shank 90 into the receiver 92 and the support post 80 of the jack 76 has been raised to an intermediate position. As can be observed, the forward portions 100 of the rigid arms 95 slide forward on the support member 102 as the support post 80 is raised. Further, the rear portions 96 of the rigid arms 95 pivot with respect to their connections to the brackets 98. The lifting of the rigid arms 95 by the support post 80 causes an upper surface 108 of the rigid arms 95 to exert an upward force on a cross-piece member 106 extending between the spring arms 94 to thereby place the spring arms 94 under tension. As can be observed in FIG. 10, with the support post 80 in the fully raised position, the spring arms 94 may transfer the weight of the tongue 72 of the trailer 74 to the tow vehicle 84.

It will be further appreciated that the mechanical linkage 70 may reduce sway between the tow vehicle 84 and the trailer 74 in the same manner of the mechanical linkage 50 as shown in FIG. 7. Likewise, as shown in FIG. 9, it will be noted that the cross-piece member 106 may engage the upper surfaces 108 of the rigid arms 95 at approximately two-thirds of the lengths of the rigid arms 95 from the support post 80. It will be further appreciated that this geometry reduces the forces and stress on the trailer jack 76 with a leverage advantage ratio of approximately 2:1 of the rigid arms 95 against the cross-piece member 106.

The phrase "approximately two-thirds," as used herein shall mean, within a margin of error of ten percent.

It is noted that a rear pivot hitch attachment is particularly useful for application with limited aft clearance.

In further reference to FIGS. 1-10, as the trailer tongue jack 26 is raised, the rigid arms 52 automatically raise the back of the spring arms 44. The geometry and positioning of the rigid arms 52 reduces the forces and stress on the jack 26, in the angle $\theta$ (shown most clearly in FIG. 3) that the rigid arms 52 form relative to horizontal at a point of initial engagement with the cross-piece member 46, and in the leverage advantage ratio provided as described above. The further the spring bars 44 are lifted, the greater is the tension produced. The rigid arms 52 compensate by increasing the leverage advantage ratio as the angle $\theta$ progressively lessens while the rigid arms 52 are pivoted closer to horizontal as the jack 26 provides input force (lifting input force).

The angle $\theta$ may be within a range of zero degrees and forty-five degrees relative to the ground upon which the trailer (not shown) and/or towing vehicle (not shown) reside. The angle $\theta$ may in some optimal cases be between about ten degrees and twenty degrees relative to horizontal at a point of initial engagement of the rigid arms 52 with the cross-piece member 46. The angle $\theta$ may, for example, be fifteen degrees, or any other suitable angle, which, if desired, could even be outside the range of ten degrees and twenty degrees relative to horizontal at a point of initial engagement of the rigid arms 52 with the cross-piece member 46, such as, for example, within a range of ten degrees and 40 degrees. Of course, the angle $\theta$ may be any angle, greater or less than forty-five degrees, as to any angle that turns out to be necessary or desirable to render operative or optimal or desired any version of an embodiment of the invention.

It is further to be understood that the phrase "point of initial engagement" may occur at different times for different configurations of the invention and, for example, the initial engagement of the rigid arm(s) with the cross-piece member may occur before or after the towing vehicle is connected to the trailer hitch. Regardless of when the point of initial engagement of the rigid arms 52 with the cross-piece member 46 occurs, there is a point at which it does occur, and the angular relationships shown by angles $\theta$ and $\beta$ are significant at that point, as described above and below.

It will be further appreciated that the spring arms 44 form an angle β relative to horizontal, which may be smaller than the angle θ. When the spring arms 44 reside in their natural, unbiased positions, the angle β may be within a range of zero to twenty degrees. The angle β may in some optimal cases be about eight degrees relative to horizontal, when the spring arms 44 reside in their natural, unbiased positions. The angle θ may be larger than the angle β by at least ten degrees, and it may also be larger than angle β by at least twenty degrees, for example. It is also possible that angles θ and β could be equal at a point of initial engagement of the rigid arms 52 with the cross-piece member 46. Of course, the angle β may be any angle, greater or less than twenty degrees which may be necessary or desirable to render operative or optimal or desired version of an embodiment of the invention.

In all cases involving the angles θ and β, as the θ angle is decreased by operation of the invention, so too does the angle β decrease in tandem with decreases of the angle θ. The eventual decrease of the angle β creates tensions in the spring arms 44 for effectively balancing and distributing the weight on the tow vehicle (not shown in FIGS. 3-6).

Figure 11:
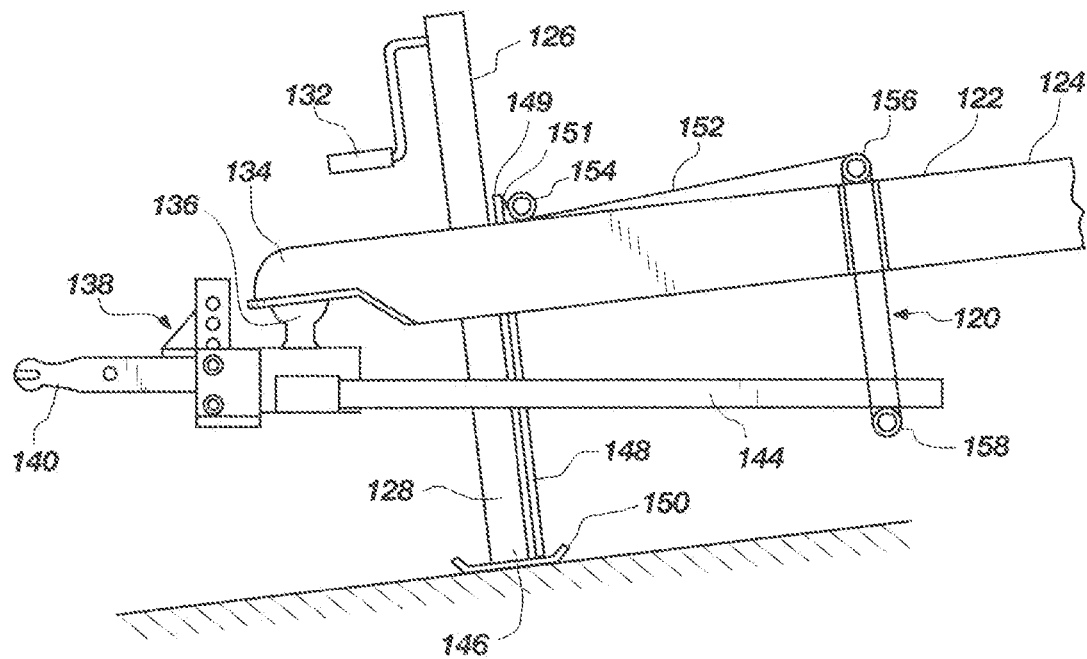
FIG. 11 is a side, breakaway view of a mechanical linkage for tensioning a pair of spring arms in a lowered, unloaded position.

In reference to FIG. 7, when the tow vehicle starts a turn, the hitch ball and spring bar head (which reside beneath the connecting portion 24A of coupler 24) rotate, pulling one of the spring bars 44 forward and the other back. Since the aft ends of the spring bars 44 are supported by and slide on the rigid arms 52, the considerable friction generated by the spring bar pressure provides a powerful motion dampening effect Referring now to FIGS. 11 and 12, another exemplary embodiment of a mechanical linkage 120 pursuant to the present disclosure is shown. As before, the mechanical linkage 120 may be installed onto a tongue 122 of a trailer 124. The tongue 122 of the trailer 124 may include a trailer jack 126 having a support post 128 for supporting the weight of the tongue 122 when the trailer 124 is disconnected from a tow vehicle 130. The support post 128 may be operable between a lowered position and a raised position. In particular, the jack 126 may include a hand-operated crank 132 for allowing a user to raise and lower the support post 128. In another embodiment of the present disclosure, the jack 126 may be operated by an electric motor in lieu of the hand-operated crank 132.

The tongue 122 may further include a coupler 134 for connecting the trailer 124 to a ball 136 of a hitch 138. The hitch 138 may include a shank 140 for engaging a receiver 142 (FIG. 12) of the tow vehicle 130. Extending rearwardly from the hitch 138 may be a pair of spring arms 144, although only one is visible in FIGS. 11-12. As before, the purpose of the spring arms 144 may be to evenly distribute the weight of the tongue 122 of the trailer 124 to the tow vehicle 130.

The mechanical linkage 120 may include an upwardly-extending rod 148 extending upwardly from a jack foot 150 attached to a terminal end 146 of the support post 128. The rod 148 may be vertically directed. Attached to a top portion 149 of the upwardly-extending rod 148 may be a terminal end 151 of a flexible member 152. The flexible member 152 may also be referred to as a "flexible portion," and may further be part of a block and tackle system for placing the spring arms 144 under tension. The block and tackle system may comprise pulleys 154, 156 and 158. It will be appreciated that the pulleys 154, 156 and 158 provide a mechanical advantage for placing the spring arms 144 under tension, and may produce an output force that is larger than the input force provided by jack 126. In particular, as the support post 128 is operated between a lowered position and a raised position, the upwardly-extending rod 148 travels upwards. The movement of the upwardly-extending rod 148 pulls on the flexible member 152 to thereby raise the spring arms 144 and place them under tension through the pulleys 154, 156 and 158. In this manner, the trailer jack 126 provides an input force to the mechanical linkage 120 and the output force of the mechanical linkage 120 is operable to place the spring arms 144 under tension.

Figures 12, 13:
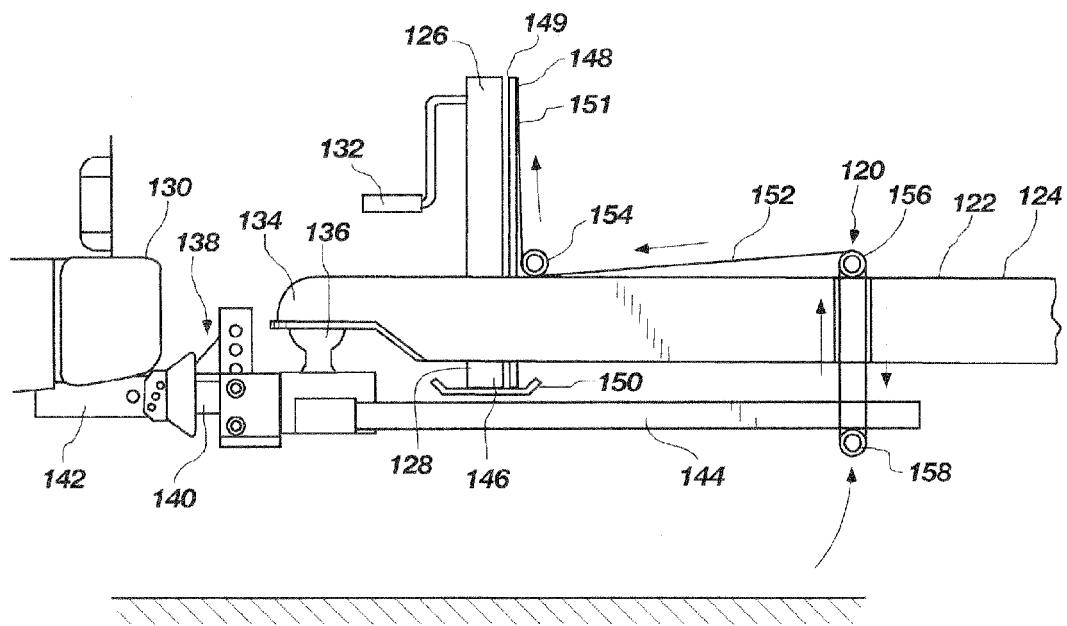
FIG. 12 is a side, breakaway view of the mechanical linkage shown in FIG. 11 in a fully raised position.
FIG. 13 is a side, breakaway view of a mechanical linkage for tensioning a pair of spring arms in a lowered, unloaded position.
Figure 14:
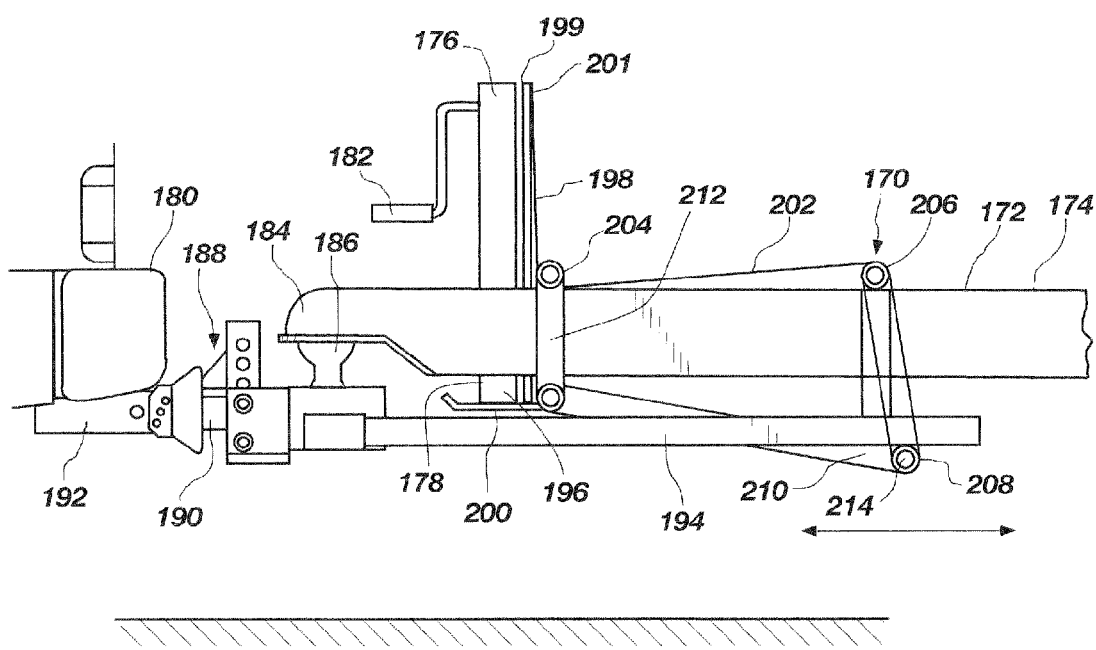
FIG. 14 is a side, breakaway view of the mechanical linkage shown in FIG. 13 in a fully raised position.

Referring now to FIGS. 13 and 14, an exemplary embodiment of a mechanical linkage 170 pursuant to the present disclosure is shown. As before, the mechanical linkage 170 may be installed onto a tongue 172 of a trailer 174. The tongue 172 of the trailer 174 may include a trailer jack 176 having a support post 178 for supporting the weight of the tongue 172 when the trailer 174 is disconnected from a tow vehicle 180. The support post 178 may be operable between a lowered position and a raised position. In particular, the trailer jack 176 may include a hand-operated crank 182 for allowing a user to raise and lower the support post 178. In another embodiment of the present disclosure, the jack 176 may be operated by an electric motor in lieu of the hand-operated crank 182.

The tongue 172 may further include a coupler 184 for connecting the trailer 174 to a ball 186 of a hitch 188. The hitch 188 may include a shank 190 for engaging a receiver 192 (FIG. 14) of the tow vehicle 180. Extending rearwardly from the hitch 188 may be a pair of spring arms 194, although only one is visible in FIGS. 13-14. As before, the purpose of the spring arms 194 may be to more evenly distribute the weight of the tongue 172 of the trailer 174 to the tow vehicle 180.

The mechanical linkage 170 may include an upwardly-extending rod 198 extending upwardly from a jack foot 200 attached to a terminal end 196 of the support post 178. The rod 198 may be vertically directed. Attached to a top portion 199 of the upwardly-extending rod 198 may be a terminal end 201 of a flexible member 202. The flexible member 202 may be part of a block and tackle system for placing the spring arms 194 under tension. The block and tackle system may comprise pulleys 204, 206 and 208. It will be appreciated that the pulleys 204, 206 and 208 provide a mechanical advantage for placing the spring arms 194 under tension. In particular, as the support post 178 is operated between a lowered position and a raised position, the upwardly-extending rod 198 travels upwards. The movement of the upwardly-extending rod 198 pulls on the flexible member 202 to thereby raise the spring arms 194 and place them under tension through the pulleys 204, 206 and 208. In this manner, the trailer jack 176 provides an input force to the mechanical linkage 170 and the output force of the mechanical linkage 170 is operable to place the spring arms 194 under tension.

In addition, the mechanical linkage 170 may include a control arm 210 mounted at one end to a bracket 212. The other end of the control arm 210 is secured to a cross-piece member 214. As the upwardly-extending rod 198 moves upwards, the flexible member 202 is operable to raise the cross-piece member 214 to thereby place the spring arms 194 under tension as the spring arms 194 are located above the cross-piece member 214. As the tow vehicle 180 initiates a turn, this may cause the spring arms 194 to move forwards or rearwards as shown by the arrow in FIG. 14. The control arm 210 may maintain the cross-piece member 214 in place. The resulting friction between the spring arms 194 and the cross-piece member 214 may dampen any swaying between the tow vehicle 180 and the trailer 174. Again, the amount of tension placed on the spring arms 194 may be varied as a function of the position of the support post 178.

Figure 15:
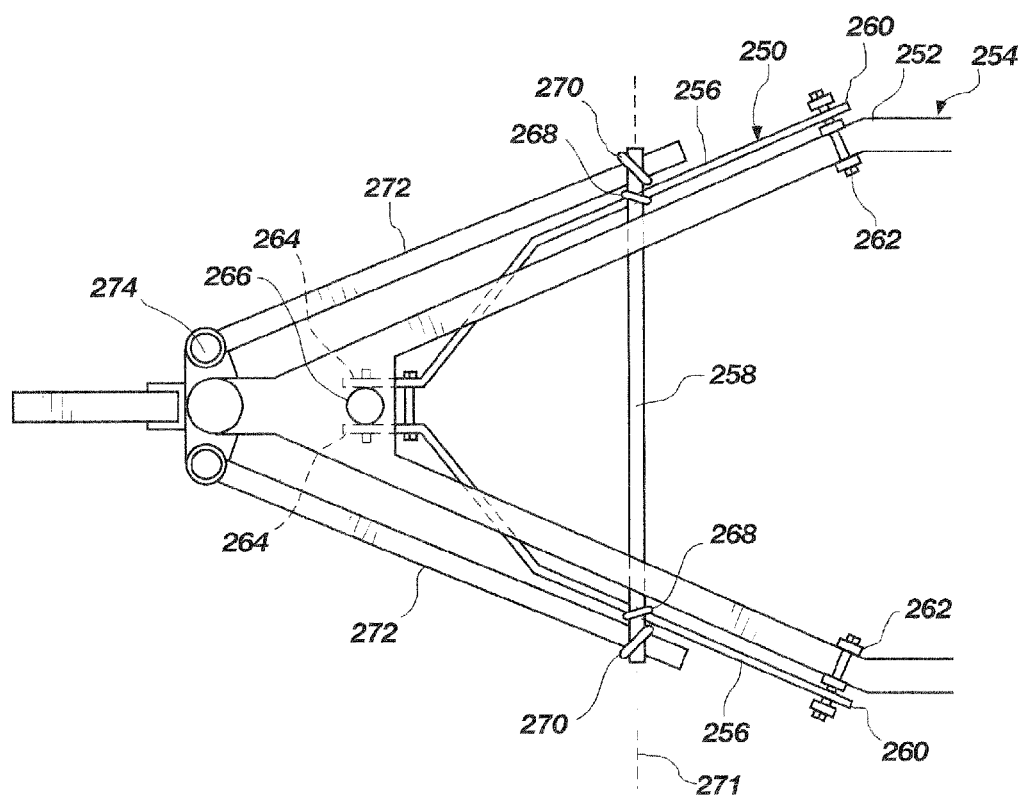
FIG. 15 is a top, breakaway view of a mechanical linkage for tensioning a pair of spring arms.
Figures 16, 17:
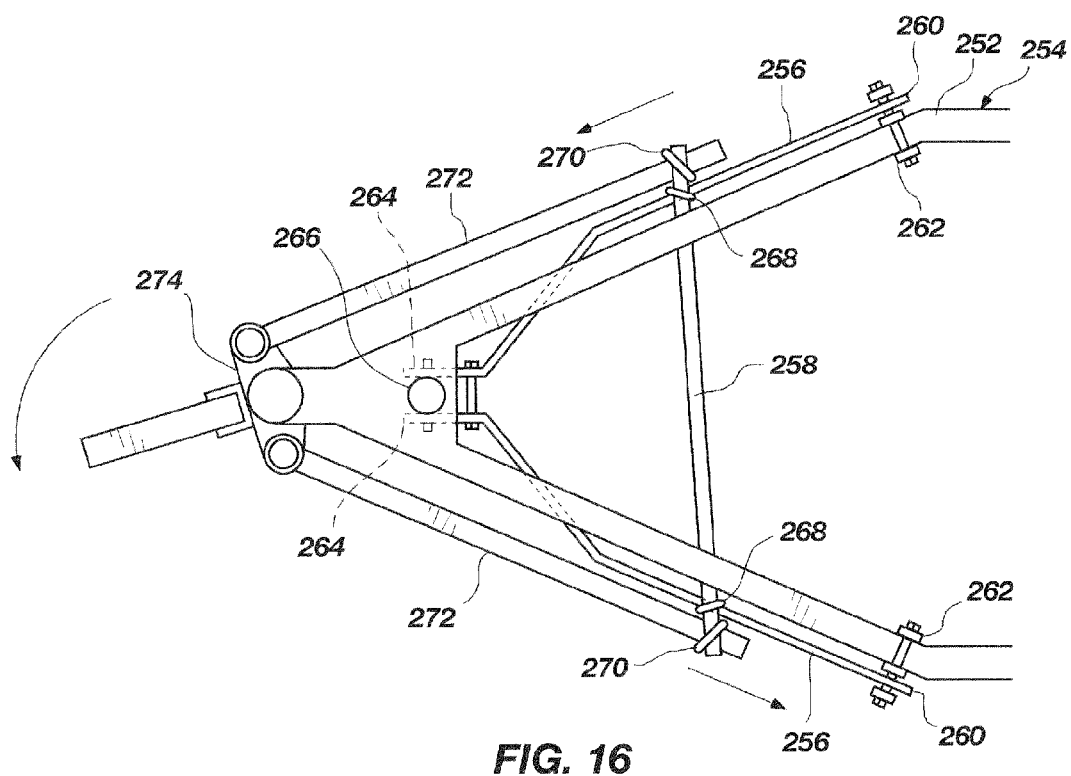
FIG. 16 is a top, breakaway view of the mechanical linkage shown in FIG. 15 undergoing a turn.
FIG. 17 is a top, breakaway view of a mechanical linkage for tensioning a pair of spring arms.

Referring now to FIGS. 15 and 16, there is depicted an embodiment of a mechanical linkage 250 attached to a tongue 252 of a trailer 254. The tongue 252 may be coupled to a hitch 274 having a pair of rearwardly extending spring arms 272. The mechanical linkage 250 may include a pair of rigid arms 256 and a cross-piece member 258. A pair of support brackets 262 may be attached to the tongue 252 of the trailer 254. A rear portion 260 of each of the rigid arms 256 may be vertically supported by one of the brackets 262. A front portion 264 of each of the rigid arms 256 may be coupled to a support post 266 of a trailer jack. Couplers 268 may fixedly attach the cross-piece member 258 to the rigid arms 256.

Brackets 270 may be affixed to the terminal ends of the cross-piece member 258. The brackets 270 may be operable to secure the pair of spring arms 272 to the cross-piece member 258. However, the brackets 270 may permit the spring arms 272 to slide forward and rearwards with respect to the cross-piece member 258, such that brackets 270 thereby operate as a connection device (and may be referred to as "connection brackets") for moveably connecting two objects, such as spring arms 272 and cross-piece member 258. The cross-piece member 258 is thus moveably connected to the pair of spring arms 272 such that said spring arms 272 are blocked from unlimited downward movement away from the cross-piece member 258, but remain slidable toward and away from a vertical plane 271 that is common to said cross-piece member 258. In this configuration, spring arms 272 may reside below the cross-piece member 258, and brackets 270 may extend over and around lower (or under) surfaces of the spring arms 272.

As before, when the support post 266 is operated from a lowered position to a raised position, the rigid arms 256 may be raised in a corresponding manner. The rigid arms 256 may in turn raise the cross-piece member 258 which in turn may raise the pair of spring arms 272 to thereby place them under tension.

As seen in FIG. 16, when a tow vehicle (not shown) executes a turn, the hitch 274 may rotate to thereby pull one of the spring arms 272 towards the hitch 274 and push the other spring arm 272 away from the hitch 274. This differential movement provided by the moveable connection between the cross-piece member 258 and the spring arms 272 provides all advantages that come with differential movement, including reduced mechanical stress and strain within the structural members involved. Since the rear portions of the spring arms 272 may be supported by and slide through the brackets 270, the friction generated by this movement may provide a powerful motion dampening effect to reduce any sway between the tow vehicle and the trailer 254.

Referring now to FIG. 17, there is depicted a mechanical linkage 280 attached to a tongue 282 of a trailer 284 pursuant to an embodiment of the present disclosure. The tongue 282 may be coupled to a hitch 285 having a pair of rearwardly extending spring arms 286. The mechanical linkage 280 may include a pair of rigid arms 288 and a cross-piece member 290. A pair of support brackets 292 may be attached to the tongue 282 of the trailer 284. A rear portion 293 of the rigid arms 288 may be vertically supported by the brackets 292. A front portion 294 of each of the rigid arms 288 may be coupled to a support post 296 of a trailer jack. Couplers 298 may fixedly attach the cross-piece member 290 to the rigid arms 288.

Brackets 300 may be affixed to the terminal ends of the cross-piece member 290. The brackets 300 may be operable to secure the pair of spring arms 286 to the cross-piece member 290. However, the brackets 300 may permit the spring arms 286 to slide forward and rearward with respect to the cross-piece member 290, such that brackets 300 thereby operate as a connection device (and may be referred to as "connection brackets") for moveably connecting two objects, such as spring arms 286 and cross-piece member 290. The cross-piece member 290 is thus moveably connected to the pair of spring arms 286 such that said spring arms 286 are blocked from unlimited downward movement away from the cross-piece member 290, but remain slidable toward and away from a vertical plane 271A that is common to said cross-piece member 290. In this configuration, spring arms 286 may reside on top of the cross-piece member 290, and brackets 300 may extend over and around upper surfaces of the spring arms 286.

It will be noted that the spring arms 286 may directly engage the cross-piece member 290. As before, when the support post 296 is operated from a lowered position to a raised position, the rigid arms 288 may be raised in a corresponding manner. The rigid arms 288 in turn may raise the cross-piece member 290 which in turn may raise the pair of spring arms 286 to thereby place them under tension. The frictional interaction between the cross-piece member 290 and the spring arms 286 may dampen any sway between a tow vehicle (not shown) and the trailer 284.

Figure 18:
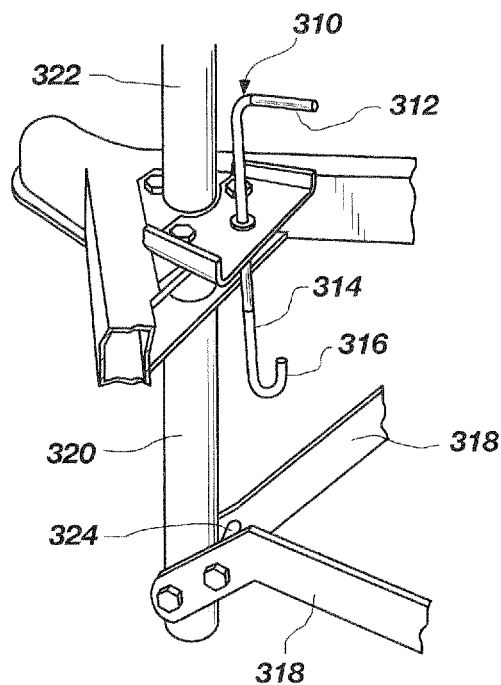
FIGS. 18 and 19 are of a safety mechanism for securing a mechanical linkage.
Figure 19:
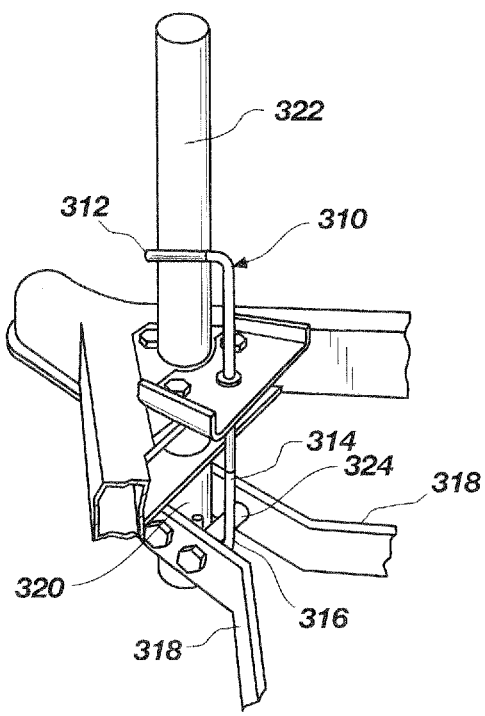

Referring now to FIGS. 18 and 19, there is depicted a safety device 310. The safety device 310 may comprise a handle 312, a shaft 314, and a hook 316. A pair of rigid arms 318 may be connected to a support post 320 of a trailer jack 322. The rigid arms 318 may be operable to place a pair of spring arms under tension. As the support post 320 is operated to a raised position, an operator may use the handle 312 of the safety device 310 to cause the hook 316 to engage a cross-piece member 324 extending between the pair of rigid arms 318. The safety device 310 may prevent the spring arms from losing their tension in the event that the support post 320 or the rigid arms 318 lower while traveling or if the trailer jack 322 should fail.

Figure 20:
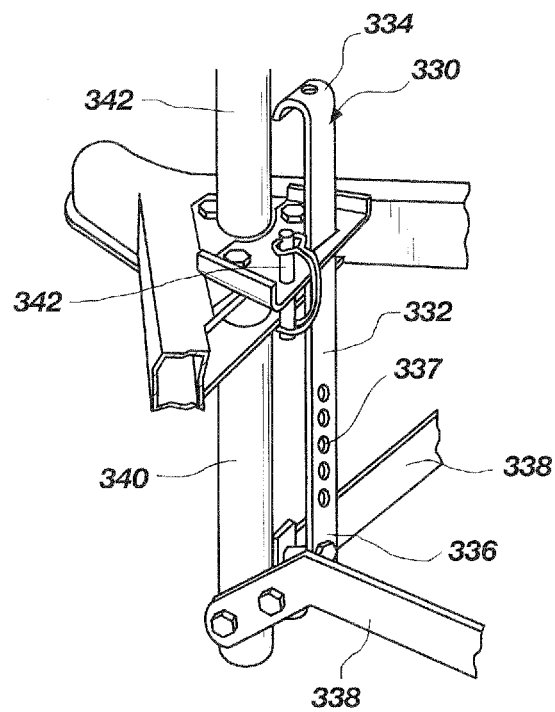
FIGS. 20 and 21 are of a safety mechanism for securing a mechanical linkage.
Figure 21:
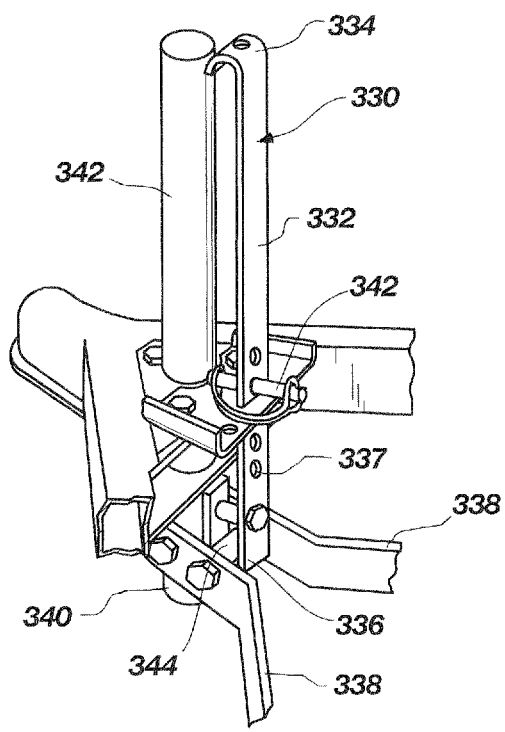

Referring now to FIGS. 20 and 21, there is depicted a safety device 330. The safety device 330 may comprise a shaft 332 having an upper end 334 and a lower end 336. Disposed on the shaft 332 may be plurality of alignment holes 337. A pair of rigid arms 338 may be coupled to a support post 340 of a trailer jack 342. The rigid arms 338 may be operable to place a pair of spring arms under tension. The lower end 336 of the support post 340 may be fixedly attached to a cross-piece member 344 extending between the rigid arms 338. The safety device 330 may raise and lower in conjunction with the support post 340 and the rigid arms 338. When the support post 340 is in the raised position as shown in FIG. 21, a pin 342 may be inserted into one of the alignment holes 337 to thereby secure the support post 340 and the rigid arms 338 in a raised position. It will be appreciated that securing the support post 340 and the rigid arms 338 in place may ensure that the tension in the spring arms will not be inadvertently released while traveling or if the trailer jack 342 should fail.

Figure 22:
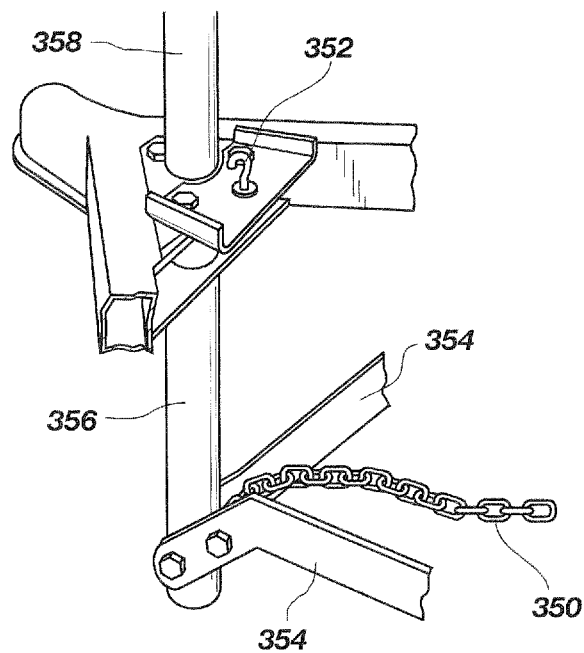
FIGS. 22 and 23 are of a safety mechanism for securing a mechanical linkage.
Figure 23:
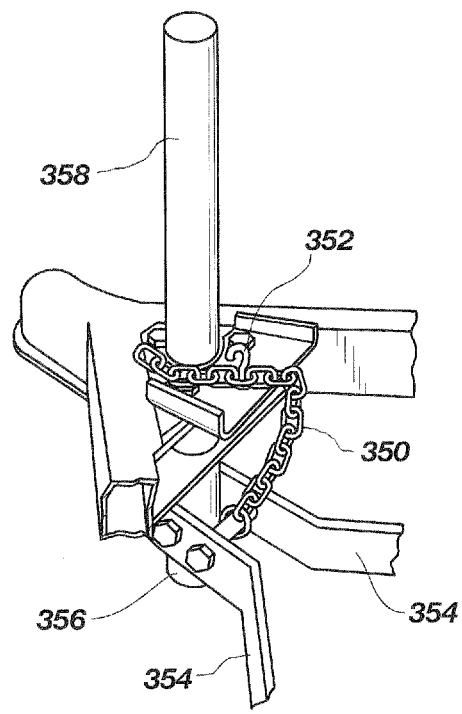

Referring now to FIGS. 22 and 23, there is depicted a safety device 350. The safety device 350 may comprise a flexible member such as a chain. A hook 352 may be used to secure a pair of rigid arms 354 connected to a support post 356 of a trailer jack 358 in a raised position using the safety device 350. In this manner, the safety device 350 may prevent spring arms placed under tension by the rigid arms 354 from inadvertently being released.

Referring again now to FIG. 24, there is depicted a mechanical linkage 360 that may be installed onto a tongue of a trailer. The mechanical linkage 360 may comprise a pair of bracket assemblies 362. The bracket assemblies 362 may be removably attachable to the tongue of the trailer using fasteners, such as bolts. The bracket assemblies 362 may be operable to provide supports for rear portions 364 of a pair of rigid arms 366. In particular, the rear portions 364 of the rigid arms 366 may slide forwards and rearwards with respect to bracket assemblies 362.

Front portions 368 of the rigid arms 366 may include mounting holes 370 for coupling the rigid arms 366 to a support post of a trailer jack. Extending upwardly from one of the rigid arms 366 is a safety device 372. A guide member 374 may be attached to the tongue of a trailer. The guide member 374 may be operable to guide the safety device 372. A locking pin may be used in conjunction with the safety device 372 to thereby secure the rigid arms 366 in place similar to the manner shown with respect to safety device 330 depicted in FIGS. 20 and 21.

A cross-piece member 376 may extend between the rigid arms 366. The cross-piece member 376 may take any shape, including round, flat, and channeled. The cross-piece member 376 can be one piece or multi-pieced. In an embodiment of the present disclosure, the cross-piece member 376 may be telescoping. Extending upwardly from a top surface of the cross-piece member 376 are a pair of risers 378, although only one is explicitly visible in FIG. 24. A top plate 380 is mounted to each of the risers 378. Mounted to each of the top plates 380 is a bracket 382. Each of the brackets 382 is operable to engage and secure a spring arm to the cross-piece member 376. The brackets 382 may allow the spring arms to slide forwards and rearwards with respect to the brackets 382. The mechanical linkage 360 may be installed onto a tongue of a trailer as an aftermarket modification of said trailer.

The mechanical linkage 360 may be operable to receive an input force from a support post of a trailer jack to which the front portions 368 of the rigid arms 366 may be attached. In response to an input force, the mechanical linkage 360 may exert an output force onto a pair of spring arms to thereby place the spring arms under tension. In particular, the mechanical linkage 360 may place the spring arms under tension as a function of the position of the support post to which the front portions 368 of the rigid arms 366 are attached.

Figure 25A:
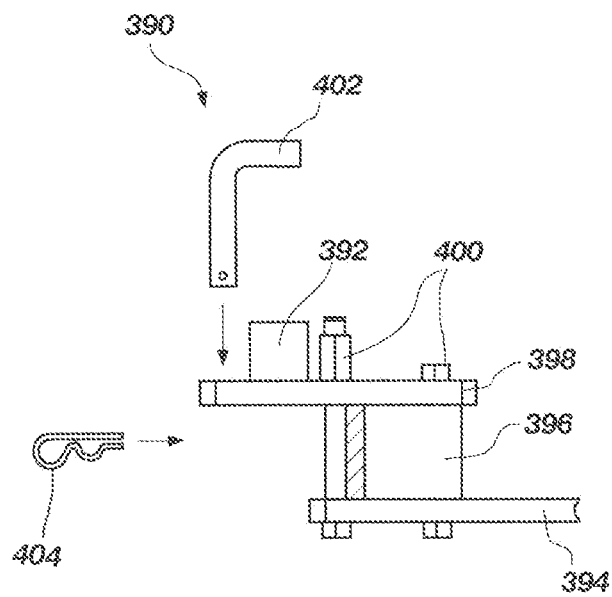
FIGS. 25A and 25B are side, breakaway views of a retaining device for a spring arm.
Figure 25B:
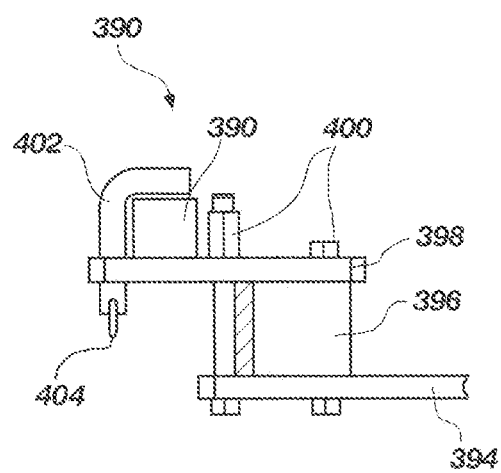

Referring now to FIGS. 25A and 25B, there is shown an embodiment of a coupling apparatus 390 for securing a spring arm 392 to a cross-piece member 394. The coupling apparatus 390 may be operable to prevent lateral movement of the spring arm 392. The cross-piece member 394 may form a part of a mechanical linkage for placing the spring arm 392 under tension. The apparatus 390 may include a riser 396 extending upwardly from a top surface of the cross-piece member 394. A top plate 398 may be disposed on top of the riser 396. A pair of fasteners 400 may secure the top plate 398 to the cross-piece member 394. The spring arm 392 may be placed onto a top surface of the top plate 398. An L-shaped pin 402 is installed through a bore in the top plate 398 and a pin 404 may secure L-shaped pin 402 to the top plate 398.

Figure 26A:
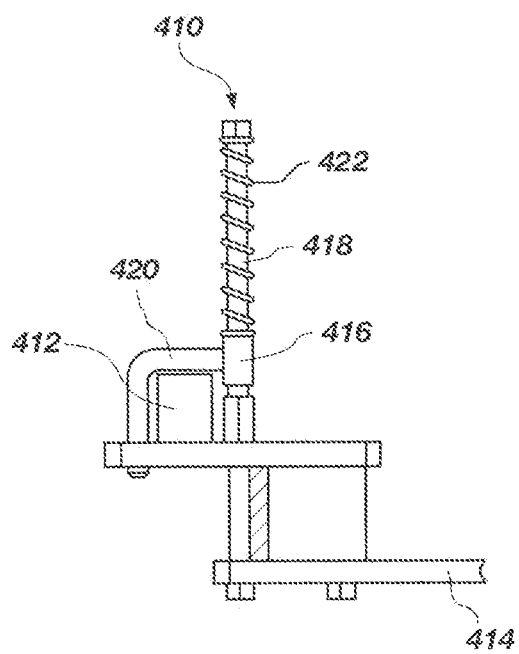
FIGS. 26A, 26B, and 26C are side, breakaway views of a retaining device for a spring arm.
Figure 26B:
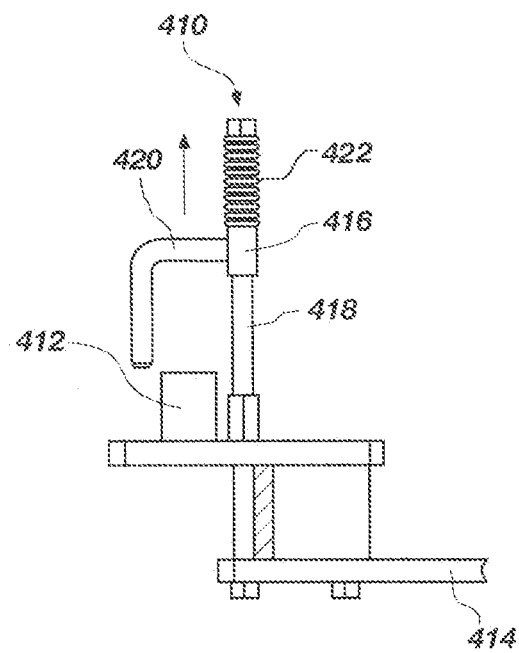
Figure 26C:
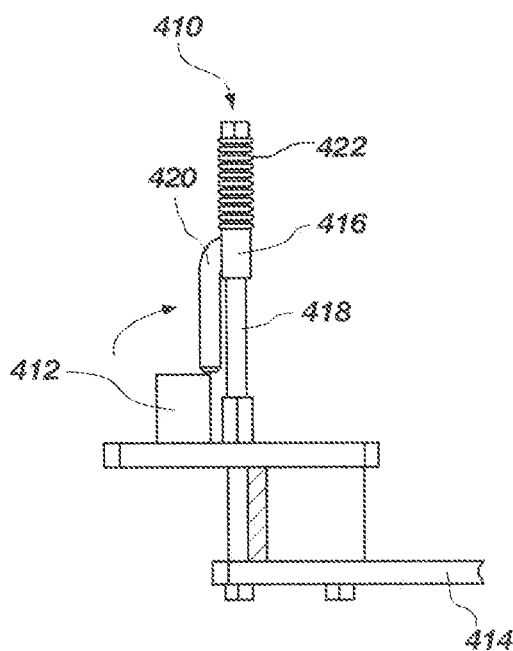

Referring now to FIGS. 26A, 26B and 26C, there is shown an embodiment of a coupling apparatus 410 for attaching a spring arm 412 to a cross-piece member 414. The apparatus 410 may comprise a slidable member 416 mounted to a shaft 418. Extending from the slidable member 416 may be a retaining member 420 for preventing lateral movement of the spring arm 412. A resilient member 422 may bias the slidable member 416 such that the retaining member 420 remains in place. To remove the spring arm 412, the slidable member 416 may be raised and rotated such that the retaining member 420 disengages the spring arm 412. It will be appreciated that the coupling apparatus 410 is an example of a quick-release.

Figure 27:
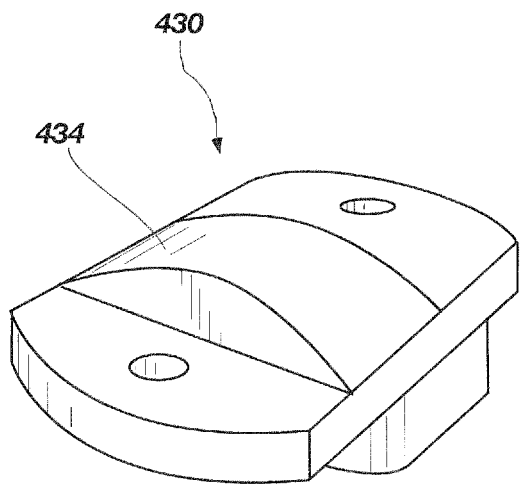
FIG. 27 is a perspective view of cam member.
Figure 28:
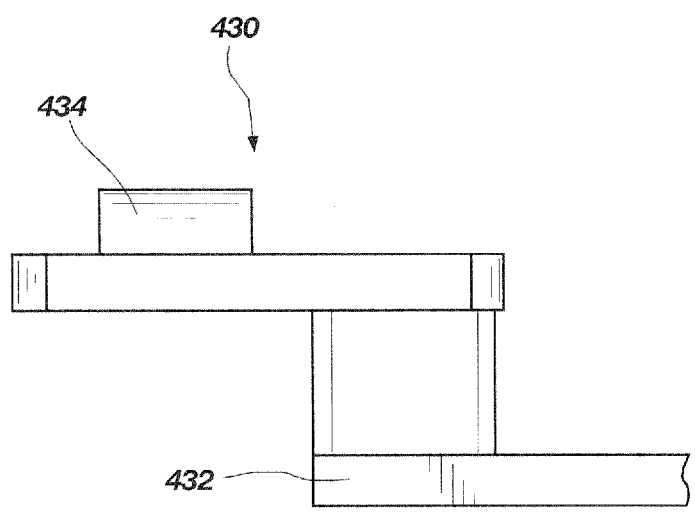
FIG. 28 is a side, breakaway view of a cam member coupled to a cross-piece member as part of a mechanical linkage.
Figure 29:
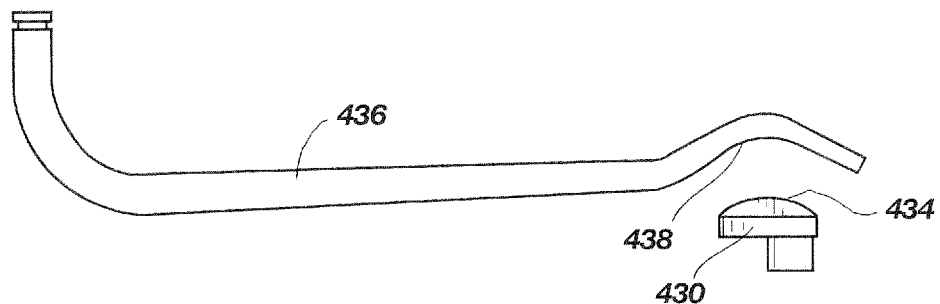
FIG. 29 is a side view of a spring arm and a cam member.
Figure 30:
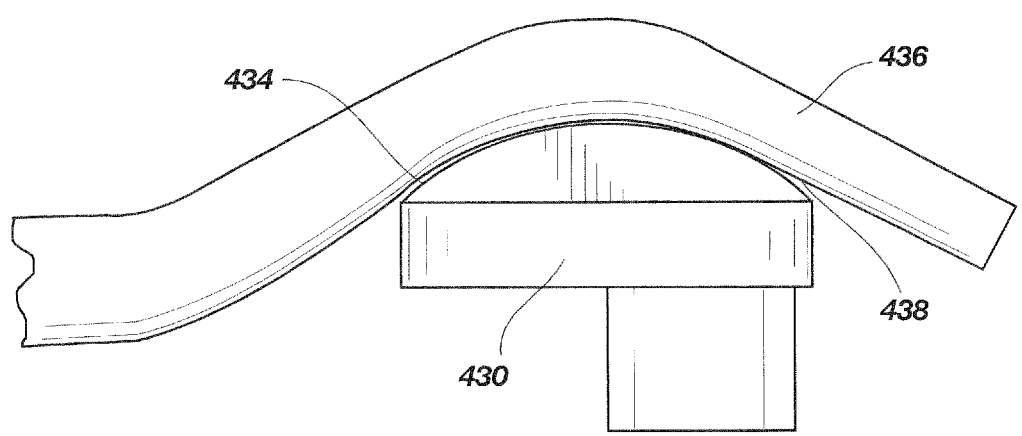
FIG. 30 is a side, breakaway view of a spring arm engaging a cam member.

Referring now to FIGS. 27 and 28, there is shown a cam member 430 for use with a cross-piece member 432 of a mechanical linkage. The cam member 430 may include a convex surface 434 and be mounted onto the end of the cross-piece member 432. The cross-piece member 432 may be part of a mechanical linkage to place a spring arm under tension. As seen in FIGS. 29 and 30, a spring arm 436 may include a concave surface 438. The concave surface 438 of the spring arm 436 and the convex surface 434 of the cam member 430 may engage each other. It will be appreciated that the concave surface 438 of the spring arm 436 and the convex surface 434 may be operable to resist movement of the spring arm 436 in a forward and a rearward direction. In this manner, the cam member 430 may reduce sway between a tow vehicle and a trailer.

It is to be understood that the phrase "mechanical linkage" as used herein shall refer to a device that is a force multiplier, and may comprise one or more rigid arms, or may instead comprise a pulley system, or any system capable of providing a greater output force than an input force provided to it, whether by way of leverage action, pulley action, or other action.

Those having ordinary skill in the relevant art will appreciate the advantages provided by the features of the present disclosure. For example, it is a feature of the present disclosure to provide an apparatus for tensioning at least one spring arm. Another feature of the present disclosure is to provide such an apparatus that reduces the effort required to place a spring arm under tension. It is a further feature of the present disclosure, in accordance with one aspect thereof, to provide an apparatus for placing at least one spring arm under tension using an input force provided by a trailer jack. It is yet another feature of the present disclosure to provide a means of tensioning a spring arm that uses the same time, effort and motion of retracting the trailer tongue support as necessary for towing, i.e. by using a single raising/lowing cycle of the jack performs two functions at once, namely, it allows the trailer coupler and the ball hitch to be connected, and it also tensions the spring arms 44, i.e. without requiring additional separate action.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. An apparatus for tensioning at least one spring arm as part of a trailer leveling system, said at least one spring arm being operable to distribute weight between a tow vehicle and a trailer, said trailer having a trailer jack with a moveable support post for supporting a front end of said trailer when said trailer is detached from said tow vehicle, said apparatus comprising:
   a mechanical linkage operable to produce an output force in response to an input force, said output force operable to place said at least one spring arm under tension;
   wherein said input force received by the mechanical linkage is provided by said trailer jack.

2. The apparatus of claim 1, wherein said mechanical linkage is further operable to transform a linear input from said trailer jack to a rotational output.

3. The apparatus of claim 1, wherein said mechanical linkage comprises at least one rigid arm.

4. The apparatus of claim 3, wherein said mechanical linkage further comprises a support member extending from said support post, wherein said support member is operable to raise, or cause to be raised, said at least one rigid arm as said support post is operated from a lowered position to a raised position.

5. The apparatus of claim 3, wherein the mechanical linkage further comprises:
   a bracket;
   a means for selectively attaching a free end of the rigid arm such that said free end is confined to a first position relative to the bracket and is blocked from movement in at least one direction relative to said bracket; and
   a means for selectively adjusting said first position relative to the bracket such that said free end is confined to a second position relative to the bracket and is blocked from movement in at least one direction relative to said bracket.

6. The apparatus of claim 5, wherein the means for selectively adjusting comprises a plurality of bores.

7. The apparatus of claim 1, wherein said mechanical linkage is installable onto said trailer as an aftermarket modification to said trailer.

8. The apparatus of claim 1, wherein said mechanical linkage comprises a flexible portion.

9. The apparatus of claim 8, wherein said mechanical linkage comprises an upwardly-extending rod disposed in a fixed relationship to said support post of said jack such that said upwardly-extending rod and support post move in conjunction with each other, wherein a terminal end of said flexible portion is attached to said upwardly-extending rod.

10. The apparatus of claim 8, wherein said mechanical linkage further comprises a block and tackle system.

11. The apparatus of claim 1, further comprising a safety mechanism for securing said mechanical linkage such that said at least one spring arm remains under tension if said trailer jack fails.

12. The apparatus of claim 1, wherein said mechanical linkage is operable to vary tension in said at least one spring arm as a function of a position of said support post.

13. The apparatus of claim 1, wherein said mechanical linkage is coupled to said support post of said trailer jack.

14. The apparatus of claim 1, wherein said mechanical linkage comprises at least one rigid arm having a non-fixed pivot point and a fixed pivot point.

15. The apparatus of claim 1, wherein said mechanical linkage provides a mechanical advantage in the form of a leverage advantage ratio of approximately 2:1.

16. The apparatus of claim 1, wherein said at least one spring arm comprises a pair of spring arms.

17. The apparatus of claim 1, wherein the mechanical linkage comprises a means for producing an output force that is larger than the input force.

18. The apparatus of claim 1, wherein said mechanical linkage includes a means for multiplying the input force provided by said trailer jack.

19. The apparatus of claim 1, wherein said mechanical linkage comprises at least one rigid arm having a non-fixed pivot point.

20. The apparatus of claim 1, wherein the at least one spring arm comprises a pair of spring arms, and wherein the apparatus is operable for tensioning said pair of spring arms as part of the trailer leveling system, said pair of spring arms both being operable to distribute weight between the tow vehicle and the trailer, said apparatus further comprising:
   cross-piece member extending between said pair of spring arms;
   wherein the cross-piece member is moveably connected to both spring arms such that said spring arms are blocked from unlimited downward movement away from the cross-piece member but remain slidable toward and away from a vertical plane that is common to said cross-piece member, and wherein the apparatus further comprises:
   connection brackets, wherein the moveable connections of the cross-piece member to the pair of spring arms are provided by the connection brackets such that friction is generated by movement of the spring arms against the connection brackets to thereby provide a powerful motion dampening effect to reduce any sway between the tow vehicle and the trailer.

21. The apparatus of claim 1 wherein the at least one spring arm comprises a pair of spring arms connected by a cross-piece member:
   wherein said mechanical linkage comprises at least one rigid arm, and wherein said rigid arm is positioned to engage the cross-piece member, and wherein the rigid arm in operation is attached and positioned such that it forms an angle $\theta$ relative to horizontal at a point of initial engagement of the rigid arm with the cross-piece member, and wherein at said angle $\theta$ is larger than an angle $\beta$ that is formed by at least one of the spring arms with horizontal.

22. The apparatus of claim 21, wherein the angle $\theta$ is larger than the angle $\beta$ by at least ten degrees at said point of initial engagement of the rigid arm with the cross-piece member.

23. An apparatus for tensioning a pair of spring arms as part of a trailer leveling system, said apparatus comprising:
   a cross-piece member extending between said pair of spring arms;
   a mechanical linkage operable to produce an output force in response to an input force, wherein said output force from the mechanical linkage places said pair of spring arms under tension and wherein said mechanical linkage comprises at least one rigid arm for applying leverage to said cross-piece member.

24. The apparatus of claim 23, wherein the mechanical linkage is in an abutting relationship with said cross-piece member such that the output force from the mechanical linkage is applied to said cross-piece member.

25. The apparatus of claim 23, wherein said input force to said mechanical linkage is provided by a jack, and wherein said jack is a trailer jack having a moveable support post for supporting a front end of a trailer when the trailer is detached from a tow vehicle.

26. The apparatus of claim 25, wherein said mechanical linkage is coupled to said support post.

27. The apparatus of claim 23, wherein said mechanical linkage includes a means for multiplying the input force.

28. The apparatus of claim 23, wherein said mechanical linkage comprises at least one rigid arm having a non-fixed pivot point and a fixed pivot point.

29. The apparatus of claim 23, wherein said cross-piece member is non-fixedly engaged to said mechanical linkage.

30. The apparatus of claim 23, wherein the cross-piece member is moveably connected to both spring arms such that said spring arms are blocked from unlimited downward movement away from the cross-piece member but remain slidable toward and away from a vertical plane that is common to said cross-piece member, and wherein the apparatus further comprises:
connection brackets, wherein the moveable connections of the cross-piece member to the pair of spring arms are provided by the connection brackets such that friction is generated by movement of the spring arms against the connection brackets to thereby provide a powerful motion dampening effect to reduce any sway between the tow vehicle and the trailer.

31. An apparatus, as part of a trailer leveling system, for tensioning at least one spring arm operable to distribute weight between a tow vehicle and a trailer, said apparatus comprising:
at least one rigid arm having a first end pivotally mounted with respect to said trailer and a second end linked to a jack;
wherein said at least one rigid arm places said at least one spring arm under tension as said second end of said at least one rigid arm is moved by said jack.

32. The apparatus of claim 31, wherein said jack is a trailer jack having a support post operable to support a tongue of the trailer when said trailer is disconnected from the tow vehicle.

33. The apparatus of claim 32, wherein said second end of the at least one rigid arm is linked to said support post of said trailer jack.

34. The apparatus of claim 31, wherein said at least one rigid arm is disposed beneath a tongue of said trailer.

35. The apparatus of claim 31, wherein said at least one spring arm comprises two spring arms.

36. The apparatus of claim 35, further comprising a cross-piece member extending between said two spring arms.

37. The apparatus of claim 36, wherein said cross-piece member is affixed to said two spring arms.

38. The apparatus of claim 36, wherein each of the two spring arms slidably engage a surface of the cross-piece member.

39. The apparatus of claim 31, wherein said at least one rigid arm comprises a pair of rigid arms.

40. The apparatus of claim 31, wherein said at least one rigid arm has a non-fixed pivot point and a fixed pivot point.

41. The apparatus of claim 31, further comprising a support bracket for supporting the first end of the at least one rigid arm.

42. The apparatus of claim 31, wherein said al least one rigid arm provides a mechanical advantage in the form of a leverage advantage ratio of approximately 2:1.

43. The apparatus of claim 42, further comprising a safety mechanism for securing said at least one rigid arm.

44. The apparatus of claim 42, wherein said at least one rigid arm is installable onto a trailer as an aftermarket modification.

45. A method, as part of a trailer leveling procedure, of tensioning at least one spring arm operable to distribute weight between a tow vehicle and a trailer, said method comprising:
installing a mechanical linkage onto a tongue of the trailer, said mechanical linkage operable to produce an output force in response to an input force, said output force operable to place said at least one spring arm under tension; and
coupling the mechanical linkage to a support post of a trailer jack for said trailer such that said input force to the mechanical linkage is provided as said support post is operated from a lowered position to a raised position.

46. The method of claim 45, wherein the at least one spring arm comprises a pair of spring arms, the method further comprising the step of installing a cross-piece member between said a pair of spring arms.

47. The method of claim 45, wherein said mechanical linkage comprises at least one rigid arm.

48. The method of claim 47, further comprising positioning the rigid arm higher in relation to the tongue of the trailer to thereby produce increased upper lifting of the spring arm.

49. The method of claim 47, further comprising positioning the rigid arm lower in relation to the tongue of the trailer to thereby produce decreased upper lifting of the spring arm.

50. The method of claim 45, further comprising the step of installing a safety device for securing the mechanical linkage.

51. An apparatus for distributing weight between a tow vehicle and a trailer, wherein said trailer includes a trailer jack with a moveable support post for supporting a front end of said trailer when said trailer is detached from said tow vehicle, said apparatus comprising:
a hitch assembly having a ball and a pair of spring arms;
a pair of brackets mounted to the tongue of said trailer, each of said brackets providing a support member; and
a pair of rigid arms having a first end and a second end, the first end of each of the rigid arms being linked to said support post and the second end of each of the rigid arms being vertically supported by a support member of one of the brackets;
a cross-piece member extending between said pair of spring arms;
wherein said first ends of the rigid arms are lifted as said support post is operated from a lowered position to a raised position such that said rigid arms are operable to place said spring arms under tension.

52. The apparatus of claim 51, wherein the cross-piece member is positioned to engage upper surfaces of the rigid arms at approximately two-thirds of lengths of the rigid arms from the support post, to thereby provide a leverage advantage ratio of the rigid arms against the cross-piece member;
wherein each rigid arm includes a substantially linear surface and wherein the pair of rigid arms are positioned such that their substantially linear surfaces cooperatively form at least a portion of opposing sides of a triangle;
wherein each rigid arm includes a tapered rear portion such that said rear portion of said arm decreases in thickness in a front-to-rear direction; and
wherein the rigid arm in operation is attached and positioned such that it forms an angle $\theta$ relative to horizontal at a point of initial engagement of the rigid arm with the cross-piece member, and wherein at said angle $\theta$ is larger than an angle $\beta$ that is formed by at least one of the spring arms with horizontal.

53. The apparatus of claim 52, wherein the cross-piece member is moveably connected to both spring arms such that said spring arms are blocked from unlimited downward movement away from the cross-piece member but remain slidable toward and away from a vertical plane that is common to said cross-piece member, anti wherein the apparatus further comprises:

connection brackets, wherein the moveable connections of the cross-piece member to the pair of spring arms are provided by the connection brackets such that friction is generated by movement of the spring arms against the connection brackets to thereby provide a powerful motion dampening effect to reduce any sway between the tow vehicle and the trailer.

54. The apparatus of claim 53, wherein the spring arms reside above the cross-piece member, and wherein the connection brackets extend over and around upper surfaces of the spring arms.

55. The apparatus of claim 53, wherein the spring arms reside below the cross-piece member, and wherein the connection brackets extend over and around under surfaces of the spring arms.

56. The apparatus of claim 52, wherein the rigid arm forms an angle relative to horizontal at a point of initial engagement with the cross-piece member, said angle being within a range of fifteen degrees and forty-five degrees.

57. The apparatus of claim 52, wherein the leverage advantage ratio is approximately 2:1.

58. The apparatus of claim 52, wherein the angle $\theta$ is substantially equal to the angle $\beta$ at said point of initial engagement of the rigid arm with the cross-piece member.

\* \* \* \* \*